US012560541B2

(12) United States Patent
Demay et al.

(10) Patent No.: US 12,560,541 B2
(45) Date of Patent: Feb. 24, 2026

(54) OPTICAL STACK, OPTICAL SYSTEM, OPTICAL DETECTION SYSTEM, AND OPTICAL IMAGING SYSTEM

(71) Applicant: 3M INNOVATIVE PROPERTIES COMPANY, St. Paul, MN (US)

(72) Inventors: Jessica E. Demay, Maplewood, MN (US); John A. Wheatley, Stillwater, MN (US); William J. Gray, Woodbury, MN (US); Johah Shaver, St. Paul, MN (US); Neil Percy, St. Paul, MN (US); Aaron M. Marcella, White Bear Lake, MN (US); Stephen M. Kennedy, St. Paul, MN (US); Zhaohui Yang, North Oaks, MN (US); Bharat R. Acharya, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 213 days.

(21) Appl. No.: 18/546,104

(22) PCT Filed: Feb. 3, 2022

(86) PCT No.: PCT/IB2022/050942
§ 371 (c)(1),
(2) Date: Aug. 11, 2023

(87) PCT Pub. No.: WO2022/185130
PCT Pub. Date: Sep. 9, 2022

(65) Prior Publication Data
US 2024/0125704 A1      Apr. 18, 2024

Related U.S. Application Data

(60) Provisional application No. 63/200,404, filed on Mar. 5, 2021.

(51) Int. Cl.
*G01N 21/64* (2006.01)
*G02B 5/30* (2006.01)

(52) U.S. Cl.
CPC ............. *G01N 21/643* (2013.01); *G02B 5/30* (2013.01)

(58) Field of Classification Search
CPC ......... G01N 21/643; G01N 2021/7796; G01N 21/62; G02B 5/30; G02B 5/288; G02B 5/20; G01J 3/443; G02F 1/133514
See application file for complete search history.

(56) References Cited

U.S. PATENT DOCUMENTS 7,119,960 B1 * 10/2006 Erdogan ................ G02B 5/288
                                                359/590
7,123,416 B1 * 10/2006 Erdogan ............... C23C 14/547
                                                359/580
(Continued)

FOREIGN PATENT DOCUMENTS

EP        1582598 A1 * 10/2005  ............ B82Y 10/00
FR        2870359 A1 * 11/2005  ............ G02B 5/208
(Continued)

OTHER PUBLICATIONS

"Absorbance Overview", Molecular Devices, LLC. [online], (Date unknown but believed to be prior to the date of the filing of the present application.), [retrieved from the internet on Oct. 9, 2023], URL <https://www.moleculardevices.com/technology/absorbance>, 7 pages.
(Continued)

*Primary Examiner* — Mohamed K Amara
(74) *Attorney, Agent, or Firm* — Clifton F. Richardson

(57) ABSTRACT

An optical stack for sensing a presence of an analyte is provided. The optical stack includes a sensor material. The sensor material includes a first optical response including a first optical property having a second value in response to an
(Continued)

excitation signal including the first optical property having a first value different from the second value. The first optical response includes a second optical property sensitive to the presence of the analyte. The optical stack includes a first optical film disposed proximate the sensor material and includes a third optical property having respective third and fourth values in response to the respective first and second values of the first optical property. The third value is different from the fourth value by at least a factor of 2.

7 Claims, 12 Drawing Sheets

(56) References Cited

U.S. PATENT DOCUMENTS

| | | | | |
|---|---|---|---|---|
| 7,245,072 | B2 | 7/2007 | Ouderkirk et al. | |
| 7,350,953 | B2 | 4/2008 | Wheatley et al. | |
| 7,357,554 | B2 | 4/2008 | Weber et al. | |
| 7,357,555 | B2 | 4/2008 | Ouderkirk et al. | |
| 7,377,679 | B2 | 5/2008 | Schultz et al. | |
| 7,480,042 | B1 * | 1/2009 | Phillips | G01N 21/4785 |
| | | | | 356/243.1 |
| 7,497,608 | B2 | 3/2009 | Wheatley et al. | |
| 9,551,616 | B2 | 1/2017 | Mcquilkin et al. | |
| 9,683,936 | B2 | 6/2017 | Oki et al. | |
| 2008/0137086 | A1 * | 6/2008 | Imura | G01N 21/251 |
| | | | | 356/433 |
| 2009/0156917 | A1 | 6/2009 | Martini et al. | |
| 2014/0170765 | A1 | 6/2014 | Ockenfuss | |
| 2017/0059563 | A1 * | 3/2017 | Smith | G01N 21/6454 |
| 2018/0039036 | A1 | 2/2018 | Fink et al. | |
| 2018/0246266 | A1 | 8/2018 | Epstein et al. | |
| 2018/0284021 | A1 * | 10/2018 | Burroughes | G01N 21/645 |
| 2019/0150811 | A1 | 5/2019 | Evans et al. | |
| 2019/0219750 | A1 | 7/2019 | Burroughes et al. | |
| 2021/0255378 | A1 * | 8/2021 | Jacobson | G02B 5/26 |
| 2022/0196897 | A1 * | 6/2022 | DeCorby | G02B 27/30 |
| 2022/0205924 | A1 * | 6/2022 | Lau | C12M 41/00 |
| 2023/0092755 | A1 | 3/2023 | Acharya et al. | |
| 2024/0125704 | A1 * | 4/2024 | Demay | G02B 5/30 |

FOREIGN PATENT DOCUMENTS

| | | | | | |
|---|---|---|---|---|---|
| GB | 2369428 | A | * | 5/2002 | G01N 21/6454 |
| JP | 2014032064 | A | | 2/2014 | |
| JP | 2021028646 | A | * | 2/2021 | G02F 1/1335 |
| WO | 1992/14136 | A1 | | 8/1992 | |
| WO | WO-2016148141 | A1 | * | 9/2016 | G02B 5/30 |
| WO | 2019/044969 | A1 | | 3/2019 | |
| WO | 2020094429 | A1 | | 5/2020 | |
| WO | 2022049436 | A1 | | 3/2022 | |
| WO | 2022049437 | A1 | | 3/2022 | |
| WO | 2022049438 | A1 | | 3/2022 | |
| WO | 2022049439 | A1 | | 3/2022 | |
| WO | 2022049440 | A1 | | 3/2022 | |
| WO | 2022049441 | A1 | | 3/2022 | |
| WO | 2023012630 | A1 | | 2/2023 | |
| WO | 2023021352 | A1 | | 2/2023 | |

OTHER PUBLICATIONS

"Fluorescent microplate applications", Thermo Fisher Scientific Inc. [online], 2006, [retrieved from the internet on Oct. 9, 2023], URL <https://www.thermofisher.com/us/en/home/life-science/cell-analysis/fluorescence-microplate-assays.html>, 2 pages.

International Search Report for PCT International Application No. PCT/IB2022/050942, mailed on May 2, 2022, 4 pages.

Jeanson, "Bacterial Colonies in Solid Media and Foods: A Review on Their Growth and Interactions with the Micro-Environment", Frontiers in Microbiology, Dec. 2015, vol. 6, p. 1284 (1-20).

Lim, "Micro-optical lens array for fluorescence detection in droplet-based microfluidics", Lab on a Chip, 2013, vol. 8, pp. 1472-1475.

* cited by examiner

OPTICAL STACK, OPTICAL SYSTEM, OPTICAL DETECTION SYSTEM, AND OPTICAL IMAGING SYSTEM

CROSS REFERENCE TO RELATED APPLICATIONS

This application is a national stage filing under 35 U.S.C. 371 of PCT/IB2022/050942, filed Feb. 3, 2022, which claims the benefit of U.S. Application No. 63/200,404, filed Mar. 5, 2021, the disclosures of which are incorporated by reference in their entirety herein.

TECHNICAL FIELD

The present disclosure relates, in general, to an optical stack. In particular, the present disclosure relates to an optical stack for an optical system, an optical detection system, and an optical imaging system.

BACKGROUND

Sensing and monitoring certain analytes may be required in various applications. For example, sensing and monitoring oxygen levels may be required in certain applications.

SUMMARY

In a first aspect, the present disclosure provides an optical stack for sensing a presence of an analyte. The optical stack includes a sensor material. The sensor material includes a first optical response including a first optical property having a second value in response to an excitation signal including the first optical property having a first value different from the second value. The first optical response includes a second optical property sensitive to the presence of the analyte. The optical stack further includes a first optical film disposed proximate the sensor material. The first optical film includes a third optical property having respective third and fourth values in response to the respective first and second values of the first optical property. The third value is different from the fourth value by at least a factor of 2.

In a second aspect, the present disclosure provides an optical stack for sensing a presence of an analyte. The optical stack includes first and second optical films defining an optical cavity therebetween. The optical stack further includes a sensor material disposed in the optical cavity. The sensor material includes a first optical response in response to an excitation signal. The first optical response includes a first optical property and a second optical property. The second optical property is sensitive to the presence of the analyte. The first and second optical films include a same third optical property having respective first and second optical values in response to the first optical property of the first optical response of the sensor material. The first optical value is different from the second optical value by at least a factor of 2.

In a third aspect, the present disclosure provides an optical stack for sensing a presence of an analyte. The optical stack includes a sensor material configured to emit an emitted light having a second wavelength when irradiated with an incident light having a different first wavelength. An optical property of the emitted light is sensitive to the presence of the analyte. The optical stack further includes a first optical film disposed on the sensor material. The first optical film includes a plurality of microlayers numbering at least 5 in total. Each of the microlayers has an average thickness of less than about 500 nm. For a same incident angle, the first optical film has first and second optical transmittances at the respective first and second wavelengths. The first and second optical transmittances are different from each other by at least a factor of 2.

In a fourth aspect, the present disclosure provides an optical stack. The optical stack includes a test material disposed between first and second optical filters. At least one of the first and second optical filters includes a plurality of microlayers numbering at least 5 in total. Each of the microlayers has an average thickness of less than about 500 nm. For an incident light incident at a target incident angle, and for at least one polarization state, the first optical filter transmits at least 60% of the incident light having a first wavelength and reflects at least 60% of the incident light having a second wavelength different from the first wavelength. For the incident light incident at the target incident angle, and for the at least one polarization state, the test material converts at least a portion of the incident light having the first wavelength to an emitted light having the second wavelength. For the incident light incident at the target incident angle, and for the at least one polarization state, the second optical filter transmits at least 60% of the incident light having the second wavelength and reflects at least 60% of the incident light having the first wavelength.

In a fifth aspect, the present disclosure provides an optical detection system. The optical detection system includes a test fluid disposed between first and second optical filters. The first optical filter is substantially more optically transmissive than the second optical filter at a first wavelength. The first optical filter is substantially more reflective than the second optical filter at a different second wavelength. The test fluid is configured to convert at least a portion of an incident light having the first wavelength to an emitted light having the second wavelength. The optical detection system further includes an optical detector configured to detect a light transmitted by at least one of the first and second optical filters having at least one of the first and second wavelengths.

In a sixth aspect, the present disclosure provides an optical imaging system. The optical imaging system includes first and second optical films defining an optical cavity therebetween. The first optical film is substantially more optically transmissive than the second optical film at a first wavelength. The first optical film is substantially more reflective than the second optical film at a different second wavelength. The optical imaging system further includes a sensor material disposed in the optical cavity. The sensor material is configured to emit an emitted light having the second wavelength when irradiated with an incident light having the first wavelength. The optical imaging system further includes an optical imaging unit disposed outside the optical cavity. The optical imaging unit is configured to form an optical image of the sensor material.

In a seventh aspect, the present disclosure provides an optical system. The optical system includes first and second optical modules defining a receiving space therebetween. The receiving space is configured to receive a sensor material therein. The sensor material is configured to emit an emitted light having a second wavelength when irradiated with an incident light having a different first wavelength. The first optical module includes a light source configured to emit a light having at least the first wavelength. The first optical module further includes a first optical film disposed between the light source and the receiving space. The second optical module includes an optical detector configured to detect a light having at least the second wavelength. The second optical module further includes a second optical film disposed between the optical detector and the receiving space. The first optical film is substantially more optically transmissive than the second optical film at the first wavelength and substantially more reflective than the second optical film at the second wavelength.

BRIEF DESCRIPTION OF THE DRAWINGS

Exemplary embodiments disclosed herein is more completely understood in consideration of the following detailed description in connection with the following figures. The figures are not necessarily drawn to scale. Like numbers used in the figures refer to like components. However, it will be understood that the use of a number to refer to a component in a given figure is not intended to limit the component in another figure labelled with the same number.

DETAILED DESCRIPTION

Figure 1:
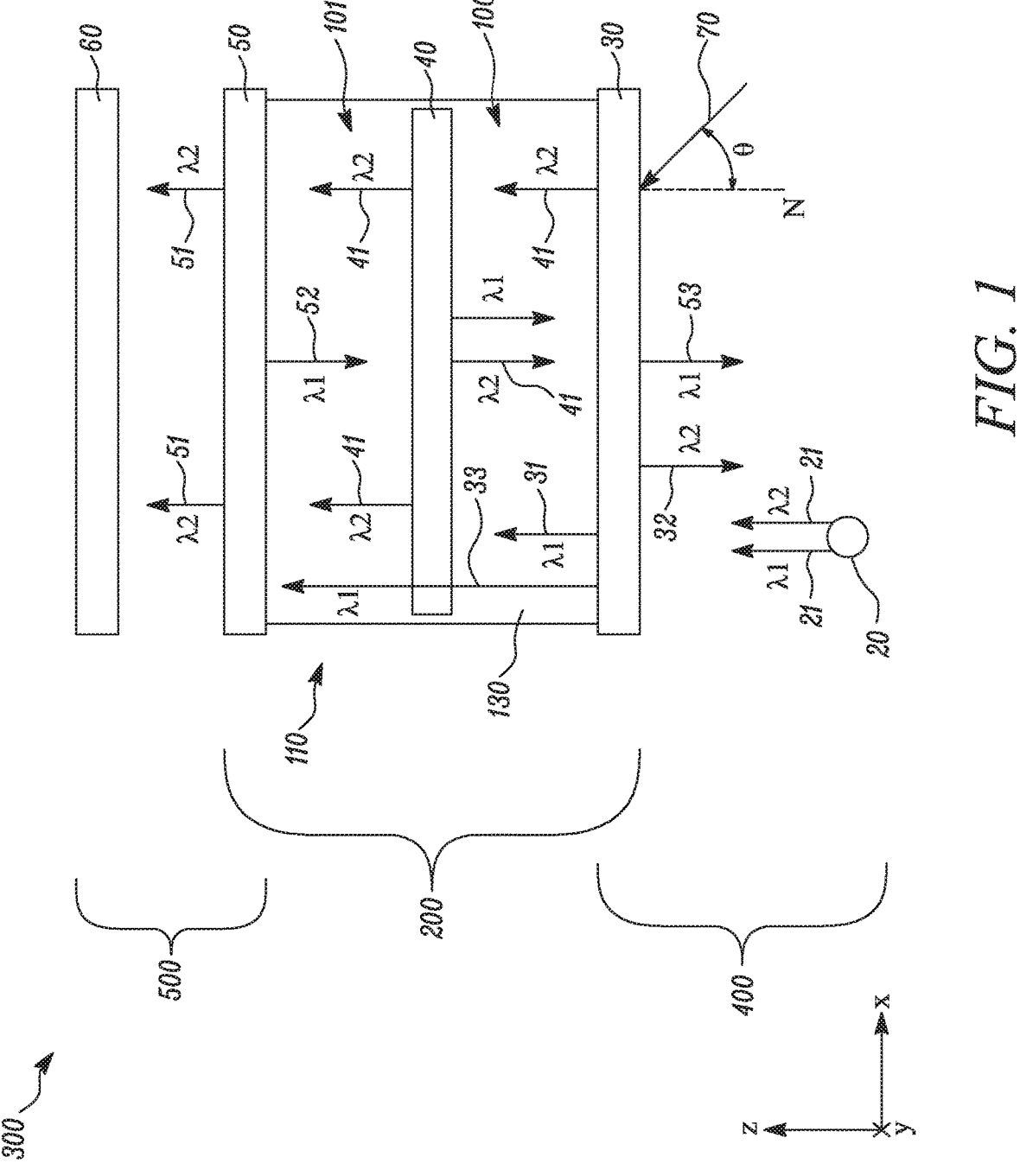
FIG. 1 is a schematic sectional view of an optical system, in accordance with an embodiment of the present disclosure.

In the following description, reference is made to the accompanying figures that form a part thereof and in which various embodiments are shown by way of illustration. It is to be understood that other embodiments are contemplated and is made without departing from the scope or spirit of the present disclosure. The following detailed description, therefore, is not to be taken in a limiting sense.

The present disclosure relates to an optical stack, an optical system including the optical stack, an optical detection system, and an optical imaging system. The optical stack, the optical system, the optical detection system, and the optical imaging system may be used for sensing a presence of an analyte.

Various optical detection devices and methods are widely used in sensing and monitoring an analyte, such as oxygen, in various applications. Specifically, it may be important to sense and monitor oxygen levels in certain applications, for example, food safety and medical applications. Generally, the optical detection devices include a test material which includes a photoluminescent material. The photoluminescent 'material may include a fluorescent material or a phosphorescent material, or a combination of both. The test material is irradiated with an excitation light, a portion of which is absorbed by the test material and converted to a differently colored emitted light. Generally, the emitted light has a longer wavelength, and therefore lower energy, than the excitation light. The emitted light may have a different color, such as red or green, from the color of the excitation light. This phenomenon is generally known as fluorescence.

In conventional fluorescence based optical detection devices, a portion of the excitation light may tend to pass through or be transmitted through the test material without being absorbed by the test material, or without being converted to the emitted light. It may be possible that a significant portion, in some cases, up to 80%, of the excitation light may not be absorbed by the test material. This may result in an underutilization of the excitation light by the test material, as the excitation light that is not absorbed may not be recycled within the optical detection device.

Further, in the conventional fluorescence based optical detection devices, the emitted light emitted by the test material may be emitted in all directions, including toward and away from an optical detector used to detect the emitted light. In other words, the optical detector may detect only a portion of the emitted light emitted from the test material. This may lead to a reduction in a signal generated by the optical detector in response to the emitted light emitted by the test material.

Further, the optical detector may form an image of the test material and sense the optical intensity of the emitted light. In the conventional fluorescence based optical detection devices, various optical elements, such as prism films, may cause scattering of light or optical distortion of an image. Such scattering of light or optical distortion may not be desirable for a precise optical imaging of the test material. Further, visual inspection of the test material may be difficult due to scattering of light or optical distortion.

The present disclosure provides an optical stack. The optical stack includes a test material disposed between first and second optical filters. At least one of the first and second optical filters includes a plurality of microlayers numbering at least 5 in total. Each of the microlayers has an average thickness of less than about 500 nanometres (nm). For an incident light incident at a target incident angle, and for at least one polarization state, the first optical filter transmits at least 60% of the incident light having a first wavelength and reflects at least 60% of the incident light having a second wavelength different from the first wavelength. For an incident light incident at the target incident angle, and for the at least one polarization state, the test material converts at least a portion of the incident light having the first wavelength to an emitted light having the second wavelength. For an incident light incident at the target incident angle, and for the at least one polarization state, the second optical filter transmits at least 60% of the incident light having the second wavelength and reflects at least 60% of the incident light having the first wavelength.

The optical stack of the present disclosure is used in an optical system to sense a presence of an analyte. The optical system further includes an optical detector to sense an optical intensity of the emitted light.

In some cases, the analyte is oxygen, which is typically an efficient quencher of fluorescence, i.e., its presence decreases the optical intensity of the fluorescence or the emitted light. Therefore, a decrease in the optical intensity of the emitted light may be detected by the optical detector to sense oxygen in the test material. Hence, the optical stack including the fluorescent test material may be used in the optical system to sense the presence of oxygen.

Further, the test material may have to be irradiated with the incident light having the first wavelength in order to cause the fluorescence. The first optical filter including the plurality of microlayers may have a relatively high optical transmittance at the first wavelength, such that at least the portion of the incident light having the first wavelength is substantially transmitted by the first optical filter and further absorbed by the test material. Further, the first optical filter may have a relatively high optical reflectance at the second wavelength, such that at least a portion of the incident light having the second wavelength is substantially reflected by the first optical filter. The first optical filter may therefore ensure that the incident light incident on the test material substantially has the first wavelength. The test material converts at least the portion of the incident light having the first wavelength to the emitted light having the second wavelength. Therefore, the optical stack including the first optical filter may maximize a transmission of the incident light having the first wavelength, which may be absorbed by the test material, while minimizing transmission of light having the second wavelength.

Further, in some cases, a part of the incident light having the first wavelength, may pass through or be transmitted through the test material toward the second optical filter, without being absorbed by the test material. The second optical filter including the plurality of microlayers may have a relatively high optical reflectance at the first wavelength, such that the part of the incident light having the first wavelength is substantially reflected by the second optical filter toward the test material, and may be further absorbed by the test material. Therefore, the second optical filter may allow the part of the incident light having the first wavelength that is transmitted through the sensor material to be reused and reabsorbed by the sensor material. Thus, the optical system including the optical stack may provide a desirable arrangement of the first and second optical filters, such that a maximum amount of the incident light having the first wavelength may be absorbed by the test material to facilitate an improved conversion of the incident light to the emitted light. In other words, the present optical system may provide an improved arrangement for a maximum utilization of the incident light to cause the fluorescence upon absorption by the test material.

Further, the second optical filter including the plurality of microlayers may have a relatively high optical transmittance at the second wavelength, such that at least a portion of the emitted light having the second wavelength is substantially transmitted by the second optical filter and further detected by the optical detector. Therefore, the second optical filter may facilitate detection, imaging and/or analysis of the emitted light having the second wavelength.

The test material may emit the emitted light in various directions. For example, the test material may emit the emitted light towards both the first and second optical filters. In some cases, a portion of the emitted light having the second wavelength may be emitted by the test material away from the second optical filter and toward the first optical filter. The first optical filter may have a relatively high optical reflectance at the second wavelength, such that at least the portion of the emitted light having the second wavelength is substantially reflected by the first optical filter toward the second optical filter, and further detected by the optical detector. Thus, the optical detector may receive a maximum amount of the emitted light having the second wavelength. In other words, the optical system including the first and second optical filters may be designed in such a way that the optical detector may receive the maximum amount of the emitted light having the second wavelength. The optical detector may form an optical image of the test material and sense the optical intensity of the emitted light having the second wavelength, for sensing the analyte and thereby enabling fluorescence based optical diagnosis. Further, the optical detector may form the optical image of the test material without any optical distortion or scattering of light by the plurality of microlayers in each of the first and second optical filters. Therefore, the optical system including the first and second optical filters may conduct efficient and improved optical analysis in a desired field of application. Further, the optical system may also allow visual inspection of the test material due to minimal or zero optical distortion.

Therefore, the optical stack including the first and second optical filters may provide an efficient recycling of the incident light having the first wavelength, such that a maximum possible quanta of the incident light is absorbed by the test material and converted to the emitted light. Specifically, the optical stack may minimize an amount of light having the first wavelength that is transmitted by the first optical filter away from the test material. Further, the optical stack may provide an efficient collection of the emitted light such that a maximum possible quanta of the emitted light is detected by the optical detector. Specifically, the optical stack may minimize an amount of light having the second wavelength that is emitted by the test material away from optical detector. Hence, the optical system including the optical stack may have significantly improved signal to noise ratio as compared to conventional testing or diagnostic devices. Further, the optical system including the optical stack may substantially improve a signal to noise ratio of fluorescence based optical analysis.

Further, a change in the optical intensity of the emitted light with an increase in oxygen concentration may allow accurate determination of oxygen level or concentration in the test material. The optical detector may be used in combination with the optical stack for determining the presence of oxygen, and various other analytes. Further, various other devices, such as controllers, electronic devices (e.g., smartphones), etc., may be combined with the optical stack as per desired application attributes. In some cases, additional layers may be combined with the first and second optical filters. Such optical layers may include secondary optical filters, light redirecting layers, protective layers, sensing layers, etc. The optical stack may also be used to sense the presence of other analytes, for example, by varying the properties of the test material, as per desired applications.

Therefore, the first and second optical filters may provide spectral filtering (based on wavelength) to allow the test material to receive the incident light having the first wavelength and the optical detector to receive the emitted light having the second wavelength. Additionally, the first optical filter may be used to substantially block light from other sources (e.g., ambient light) from reaching the test material. The second optical filter may further substantially prevent light other than the emitted light from being transmitted to the optical detector. The first optical filter may block an incident light having the second wavelength. Similarly, the second optical filter may block an incident light having the first wavelength. Therefore, the first and second optical filters may be optimized for a specific combination of the first and second wavelengths to allow accurate sensing of the analyte. A design of the first and second optical filters may be conveniently varied as per various application parameters, for example, the first and second wavelengths, a desired thickness of the optical stack, a desired permeability of the analyte, etc.

Referring now to figures, FIG. 1 illustrates a schematic sectional view of an optical system 300 according to an embodiment of the present disclosure.

The optical system 300 defines mutually orthogonal x, y, and z-axes. The x and y-axes are in-plane axes of the optical system 300, while the z-axis is a transverse axis disposed along a thickness of the optical system 300. In other words, x and y-axes are along plane of the optical system 300, and the z-axis is perpendicular to the plane of the optical system 300. In some embodiments, the optical system 300 can be interchangeably referred to as an optical imaging system 300.

The optical system 300 includes first and second optical modules 400, 500. The first and second optical modules 400, 500 define a receiving space 110 therebetween. The receiving space 110 is configured to receive a sensor material 40 therein. The first optical module 400 includes a light source 20 and a first optical film 30 disposed between the light source 20 and the receiving space 110. In some embodiments, the first optical film 30 is disposed adjacent to the receiving space 110. The second optical module 500 includes an optical detector 60 and a second optical film 50 disposed between the optical detector 60 and the receiving space 110. In some embodiments, the second optical film 50 is disposed adjacent to the receiving space 110. In some embodiments, the receiving space 110 can be interchangeably referred to as an optical cavity 110.

In some embodiments, the first and second optical films 30, 50 can be interchangeably referred to as first and second optical filters 30, 50, respectively. In some embodiments, the sensor material 40 can be interchangeably referred to as a test material 40. In some embodiments, the test material 40 is disposed between the first and second optical filters 30, 50.

The sensor material 40 includes a first optical response 41 in response to an excitation signal 31. The first optical response 41 includes a first optical property and a second optical property. Specifically, the first optical response 41 includes the first optical property having a second value $\lambda 2$ (also shown in FIG. 6). The excitation signal 31 includes the first optical property having a first value $\lambda 1$ (also shown in FIG. 6) different from the second value $\lambda 2$. Therefore, the sensor material 40 includes the first optical response 41 including the first optical property having the second value $\lambda 2$ in response to the excitation signal 31 including the first optical property having the first value $\lambda 1$ different from the second value $\lambda 2$.

In some embodiments, the excitation signal 31 is interchangeably referred to as an incident light 31. In some embodiments, the first optical response 41 is interchangeably referred to as an emitted light 41.

Figure 4A:
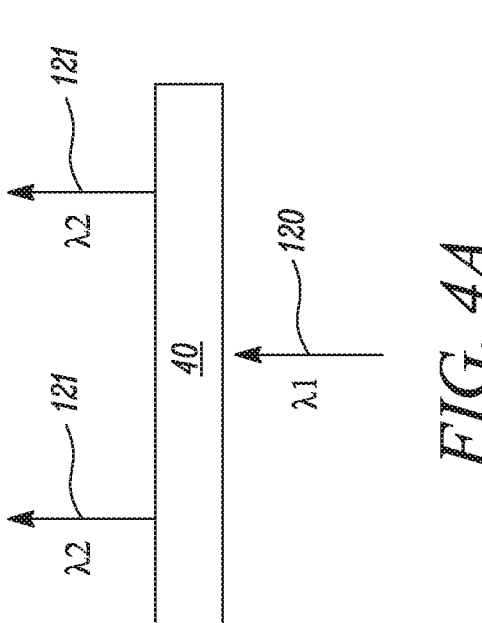
FIG. 4A is a schematic view of a sensor material of the optical stack of FIG. 2, in accordance with an embodiment of the present disclosure.

In some embodiments, the excitation signal 31 includes an incident light 120 (shown in FIG. 4A). In some embodiments, the first optical response 41 of the sensor material 40 includes an emitted light 121 (shown in FIG. 4A) in response to the incident light 120.

In some embodiments, the first optical property includes a wavelength. Therefore, in some embodiments, the wavelength has the first value $\lambda 1$ for the incident light 120 and the second value $\lambda 2$ for the emitted light 121. Moreover, the first and second values $\lambda 1$, $\lambda 2$ of the first optical property can also be interchangeably referred to as the respective first and second values $\lambda 1$, $\lambda 2$ of the wavelength. Thus, in some embodiments, the first optical property of the emitted light 121 includes the wavelength $\lambda 2$ of the emitted light 121.

In some embodiments, the first value $\lambda 1$ of the first optical property of the excitation signal 31 can be interchangeably referred to as a first wavelength $\lambda 1$. In some embodiments, the second value $\lambda 2$ of the first optical property of the first optical response 41 of the sensor material 40 can be interchangeably referred to as a second wavelength $\lambda 2$. In some embodiments, the first and second values $\lambda 1$, $\lambda 2$ of the wavelength can be interchangeably referred to as the first and second wavelengths $\lambda 1$, $\lambda 2$, respectively. In some embodiments, the first value $\lambda 1$ of the wavelength can be interchangeably referred to as the wavelength $\lambda 1$ of the incident light 120. In some embodiments, the second value $\lambda 2$ of the wavelength can be interchangeably referred to as the wavelength $\lambda 2$ of the emitted light 121.

Referring to FIGS. 1 and 4A, in some embodiments, the sensor material 40 is configured to emit the emitted light 121 having the second wavelength $\lambda 2$ when irradiated with the incident light 120 having the different first wavelength $\lambda 1$. Therefore, the sensor material 40 absorbs a portion of the incident light 120 having the first wavelength $\lambda 1$, and further converts it to the emitted light 121 having the second wavelength $\lambda 2$. In some embodiments, the sensor material 40 is configured to emit the emitted light 41 having the second wavelength $\lambda 2$ when irradiated with the incident light 31 having the different first wavelength $\lambda 1$. In other words, the test material 40 converts at least a portion of the incident light 31 having the first wavelength $\lambda 1$ to the emitted light 41 having the second wavelength $\lambda 2$.

In some embodiments, the first and second values $\lambda 1$, $\lambda 2$ are between about 420 nanometres (nm) and about 680 nm. In other words, each of the first and second values $\lambda 1$, $\lambda 2$ may correspond to a wavelength within a visible wavelength range. Therefore, each of the wavelengths $\lambda 1$, $\lambda 2$ of the incident light 120 and the emitted light 121, respectively, may correspond to a wavelength within the visible wavelength range.

In some embodiments, one of the first and second values $\lambda 1$, $\lambda 2$ is between about 420 nm and about 680 nm, and the other one of the first and second values $\lambda 1$, $\lambda 2$ is between about 700 nm and about 2000 nm. In other words, one of the first and second values $\lambda 1$, $\lambda 2$ may correspond to a wavelength within the visible wavelength range, and the other one of the first and second values $\lambda 1$, $\lambda 2$ may correspond to a wavelength within an infrared wavelength range. Therefore, one of the wavelengths $\lambda 1$, $\lambda 2$ of the incident light 120 and the emitted light 121, respectively, may correspond to a wavelength within the visible wavelength range, and the other one of the wavelengths $\lambda 1$, $\lambda 2$ of the incident light 120 and the emitted light 121, respectively, may correspond to a wavelength within the infrared wavelength range.

In some embodiments, one of the first and second values λ1, λ2 is between about 300 nm and about 400 nm, and the other one of the first and second values λ1, λ2 is between about 401 nm and about 680 nm. In other words, one of the first and second values λ1, λ2 may correspond to a wavelength within an ultraviolet (UV) range, and the other one of the first and second values λ1, λ2 may correspond to a wavelength within the visible wavelength range. Therefore, one of the wavelengths λ1, λ2 of the incident light 120 and the emitted light 121, respectively, may correspond to a wavelength within the UV range, and the other one of the wavelengths λ1, λ2 of the incident light 120 and the emitted light 121, respectively, may correspond to a wavelength within the visible wavelength range.

In some embodiments, the first and second values λ1, λ2 are separated by at least 10 nm. In some embodiments, the first and second values λ1, λ2 are separated by at least 25 nm, at least 50 nm, at least 75 nm, or at least 100 nm.

In some embodiments, the first value λ1 is smaller than the second value λ2. In other words, the wavelength λ1 of the incident light 120 is smaller than the wavelength λ2 of the emitted light 121. Thus, an energy of the incident light 120 is greater than an energy of the emitted light 121. Such a phenomenon may be referred to as down-conversion fluorescence. When the sensor material 40 exhibits down-conversion fluorescence, an amount of energy may be absorbed by the sensor material 40 during fluorescence such that the emitted light 121 has a lower energy than the incident light 120. In some embodiments, the incident light 120 is a blue light and the emitted light 121 is a green light or a red light. In some embodiments, the incident light 120 may be in the visible wavelength range, and the emitted light 121 may be in the infrared wavelength range. In some embodiments, the incident light 120 may be in the UV range from about 300 nm to about 400 nm. In some embodiments, the incident light 120 is a UV light and the emitted light 121 is a visible light.

In some embodiments, the first value λ1 is greater than the second value λ2. In other words, the wavelength λ1 of the incident light 120 may be greater than the wavelength λ2 of the emitted light 121. Thus, an energy of the incident light 120 may be lower than an energy of the emitted light 121. Such a phenomenon may be referred to as up-conversion fluorescence, where the sensor material 40 absorbs the incident light 120 and emits the emitted light 121 such that the emitted light 121 has a higher energy than the incident light 120. In some embodiments, the incident light 120 is a green light or a red light, and the emitted light 121 is a blue light. In some embodiments, the incident light 120 may be in the infrared wavelength range, and the emitted light 121 may be in the visible wavelength range. In some embodiments, the emitted light 121 may be in the UV range from about 300 nm to about 400 nm.

For the sensor material 40, the first optical response 41 includes the second optical property sensitive to the presence of an analyte. In other words, the second optical property of the emitted light 121 is sensitive to the presence of the analyte. In some embodiments, the second optical property of the emitted light 121 includes an optical intensity of the emitted light 121 sensitive to the analyte.

In some embodiments, the second optical property of the emitted light 121 can be interchangeably referred to as an optical property of the emitted light 121. Thus, the optical property of the emitted light 121 is sensitive to the presence of the analyte. Further, in some embodiments, the optical property of the emitted light 121 includes the optical intensity of the emitted light 121.

With continued reference to FIG. 1, the light source 20 is configured to emit a light 21 having at least the first wavelength λ1. The light 21 having at least the first wavelength λ1 is incident on the first optical film 30. In some other embodiments, the light 21 may further include the second wavelength λ2. The first optical film 30 transmits a portion of the light 21 as the excitation signal 31, such that the excitation signal 31 substantially includes the incident light 120 having the first wavelength λ1. The first optical film 30 reflects another portion of the light 21 as a reflected light 32, such that the reflected light 32 substantially has the second wavelength λ2.

In some other embodiments, the light source 20 may include any one or more of filament or arc lamps, light emitting diodes (LEDs), linear cold cathode fluorescent tubes, non-linear cold cathode fluorescent tubes, flat fluorescent panels, and external electrode fluorescent lamps.

The light 21 emitted by the light source 20 may be generally unpolarized. However, in some cases, the light 21 may be an at least partially polarized light. For the purpose of explanation, the light 21 may be treated as a light having an unknown or arbitrary polarization state or a distribution of polarization states.

In some cases, a light 33 of the excitation signal 31, having the first wavelength λ1, may pass or be transmitted through the sensor material 40, without being converted to the first optical response 41 by the sensor material 40. The second optical film 50 substantially reflects the light 33 as a light 52, having the first wavelength λ1, toward the sensor material 40. The light 52 having the first wavelength λ1 is incident on the sensor material 40. The sensor material 40 converts a portion of the incident light 52 to the first optical response 41. Specifically, the sensor material 40 emits the first optical response 41 having the second wavelength λ2, toward each of the first and second optical films 30, 50, in response to the light 52 having the first wavelength λ1. Further, upon receiving the first optical response 41 having the second wavelength λ2, the first optical film 30 substantially reflects the first optical response 41, having the second wavelength λ2, toward the second optical film 50 and the optical detector 60.

In some embodiments, in the optical imaging system 300, the first and second optical films 30, 50 define the optical cavity 110 therebetween. The sensor material 40 is disposed in the optical cavity 110. Specifically, the sensor material 40 is disposed in the optical cavity 110, such that a first cavity 100 is defined between the first optical film 30 and the sensor material 40, and a second cavity 101 is defined between the sensor material 40 and the second optical film 50. Thus, the optical cavity 110 includes the first and second optical cavities 100, 101.

In some embodiments, the optical cavity 110 is filled with a filler layer 130 having an index of refraction of less than about 1.5 at at least one of the first and second wavelengths λ1, λ2. In some other embodiments, the index of refraction of the filler layer 130 is less than about 1.45, less than about 1.4, less than about 1.35, less than about 1.3, or less than about 1.2 at the at least one of the first and second wavelengths λ1, λ2.

The optical detector 60 is configured to detect a light 51 having at least the second wavelength λ2. In some embodiments, the optical detector 60 is configured to detect the light 51 transmitted by at least one of the first and second optical filters 30, 50 having the at least one of the first and second wavelengths $\lambda 1$, $\lambda 2$. In some embodiments, the optical detector 60 detects the light 51 transmitted by the second optical filter 50 having at least the second wavelength $\lambda 2$.

In some embodiments, the optical detector 60 can be interchangeably referred to as an optical imaging unit 60.

The optical imaging unit 60 is disposed outside the optical cavity 110 and configured to form an optical image of the sensor material 40. In some embodiments, the optical imaging unit 60 is further configured to sense an optical intensity of the light 51 at the at least one of the first and second wavelengths $\lambda 1$, $\lambda 2$.

With continued reference to FIG. 1, the optical system 300 further includes an optical stack 200 for sensing a presence of the analyte. The analyte is generally a chemical constituent that is of interest in an analytical or a diagnostic procedure. In some embodiments, the analyte includes oxygen. The optical stack 200 includes the sensor material 40, the first optical film 30, and the second optical film 50. The first optical film 30 is disposed proximate the sensor material 40. In some embodiments, the first optical film 30 is disposed on the sensor material 40. In some embodiments, the second optical film 50 is disposed proximate the sensor material 40 and opposite the first optical film 30. In some embodiments, the second optical film 50 is disposed on the sensor material 40 and opposite the first optical film 30. The first optical film 30, the sensor material 40, and the second optical film 50 are arranged along the z-axis of the optical system 300.

Figure 2:
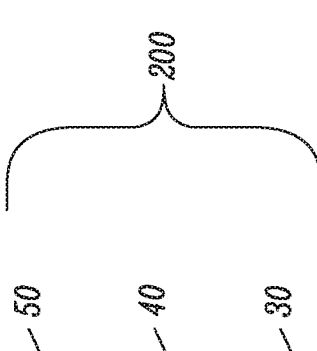
FIG. 2 is a schematic sectional view of an optical stack of the optical system of FIG. 1, including first and second optical films, in accordance with an embodiment of the present disclosure.
Figure 2:
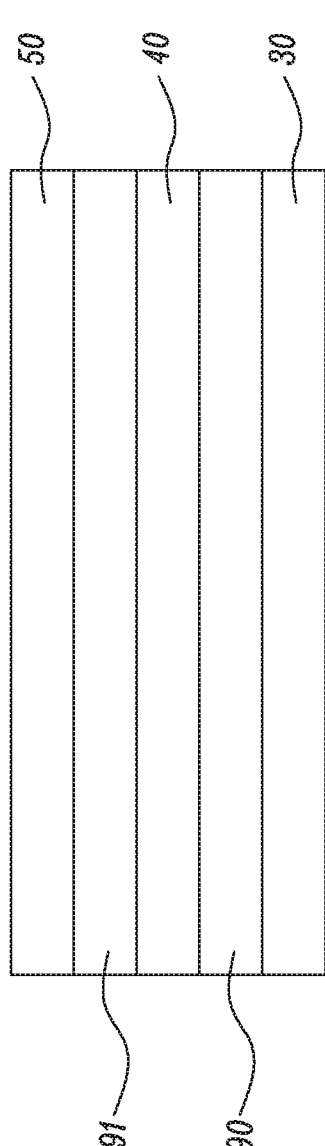
Figure 2:
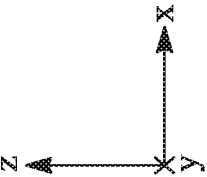

FIG. 2 illustrates a schematic sectional view of the optical stack 200 according to an embodiment of the present disclosure. In some embodiments, the sensor material 40 is bonded to at least one of the first and second optical films 30, 50. In some embodiments, the sensor material 40 is bonded to the at least one of the first and second optical films 30, 50 via an optical adhesive layer.

In some embodiments, the sensor material 40 is bonded to the first optical film 30. In the illustrated embodiment of FIG. 2, the sensor material 40 is bonded to the first optical film 30 via an optical adhesive layer 90. In some embodiments, the optical adhesive layer 90 includes an optically clear adhesive (OCA). In some other embodiments, the optical adhesive layer 90 may include epoxy, lamination, or any other suitable layer.

In some embodiments, the sensor material 40 is bonded to the second optical film 50. In the illustrated embodiment of FIG. 2, the sensor material 40 is bonded to the second optical film 50 via an optical adhesive layer 91. In some embodiments, the optical adhesive layer 91 includes an optically clear adhesive (OCA). In some other embodiments, the optical adhesive layer 91 may include epoxy, lamination, or any other suitable layer.

In some other embodiments, the optical stack 200 may include additional or intermediate films, layers, or components, such as light control films, light redirecting layers or substrate layers. The optical stack 200 may, in total, be of any suitable thickness based on desired application attributes.

The optical stack 200 also defines the mutually orthogonal x, y, and z-axes. In some embodiments, the first optical film 30, the optical adhesive layer 90, the sensor material 40, the optical adhesive layer 91, and the second optical film 50 may be substantially co-extensive with each other, or of same in-plane dimensions (i.e., length and width). In some embodiments, the first optical film 30, the optical adhesive layer 90, the sensor material 40, the optical adhesive layer 91, and the second optical film 50 may be substantially co-extensive with each other in the x-y plane. The first optical film 30, the optical adhesive layer 90, the sensor material 40, the optical adhesive layer 91, and the second optical film 50 are disposed adjacent to each other along the z-axis of the optical stack 200.

In some embodiments, the sensor material 40 includes a photoluminescent material. The photoluminescent material absorbs a photon (mainly UV and blue light), excites one of its electrons to a higher electronic excited state, and then radiates a photon as the electron returns to a lower energy state. In other words, the photoluminescent material emits a light after absorption of photons of an incident light (electromagnetic radiation). Such a phenomenon is known as photoluminescence. Generally, an emitted light has a wavelength different from a wavelength of an incident light.

In some embodiments, the photoluminescent material may include quantum dots. When a quantum dot is irradiated with an incident light, electrons in the quantum dot is excited to a higher state, and on return of the electrons to an original state, an excess energy possessed by the electrons is released as an emitted light. Wavelength of the emitted light depends on wavelength of the incident light and an energy gap between the original state and the higher state. The energy gap, in turn, depends on a size of the quantum dot. By varying the size of the quantum dot, for a given wavelength of the incident light, wavelength of the emitted light may be controlled. In some embodiments, quantum dots may be used for down-conversion fluorescence or for up-conversion fluorescence.

In some embodiments, the photoluminescent material includes one or more of a fluorescent material and a phosphorescent material. When subjected to an incident light, the fluorescent material exhibits fluorescence, and the phosphorescent material exhibits phosphorescence. Fluorescence is relatively a fast process, and some amount of energy is dissipated or absorbed during the process so that re-emitted light has an energy different from the absorbed incident light. In phosphorescence, the phosphorescent material does not immediately re-emit the absorbed incident light. Phosphorescence is emission of light from triplet-excited states, in which the electron in the excited orbital has the same spin orientation as the ground-state electron. Transitions to the ground state are spin-forbidden, and the emission rates are relatively slow. The result is a slow process of radiative transition back to the singlet state, sometimes lasting from milliseconds to seconds to minutes.

The fluorescent material is usually a phosphor that may include solid inorganic materials consisting of a host lattice, usually intentionally doped. Phosphors are usually made from a suitable host material with an added activator. The host materials are typically oxides, nitrides and oxynitrides, sulfides, selenides, halides or silicates of zinc, cadmium, manganese, aluminum, silicon, or various rare-earth metals. The activators prolong the emission time (afterglow).

In some embodiments, the phosphorescent material includes one or more of a porphyrin, a pi-conjugated molecule, and a pi-conjugated polymer. In some embodiments, the sensor material 40 may include a solid material. In some embodiments, the sensor material 40 includes a gel material.

In some embodiments, the sensor material 40 may include a supporting structure (not shown) such as a substrate. The supporting structure may include a suitable fluid handling architecture (not shown) to facilitate interaction between the sensor material 40 and the analyte.

In some embodiments, the sensor material 40 may be selected from a group including a test card, a microfluidic chip, a cuvette, a tube, an array plate, a lateral flow assay and a combination thereof.

The phosphorescent material is oxygen sensitive so that in a presence of oxygen, the optical intensity of the emitted light 121 decreases. Thus, during phosphorescence, the optical intensity of the emitted light 121 decreases with increasing partial pressure of oxygen. In other words, it can be stated that oxygen acts as an efficient phosphorescence quencher, as it decreases the optical intensity of the emitted light 121 emitted by the phosphorescent material in the sensor material 40.

The photoluminescent material is oxygen sensitive so that in the presence of oxygen, the optical intensity of the emitted light 121 decreases. Thus, during photoluminescence, the optical intensity of the emitted light 121 decreases with increasing partial pressure of oxygen. In other words, it can be stated that oxygen acts as a photoluminescence quencher, as it decreases the optical intensity of the emitted light 121 emitted by the photoluminescent material in the sensor material 40. Therefore, in an absence of oxygen or any other photoluminescence quencher, the optical intensity of the emitted light 121 is relatively higher.

Figure 3:
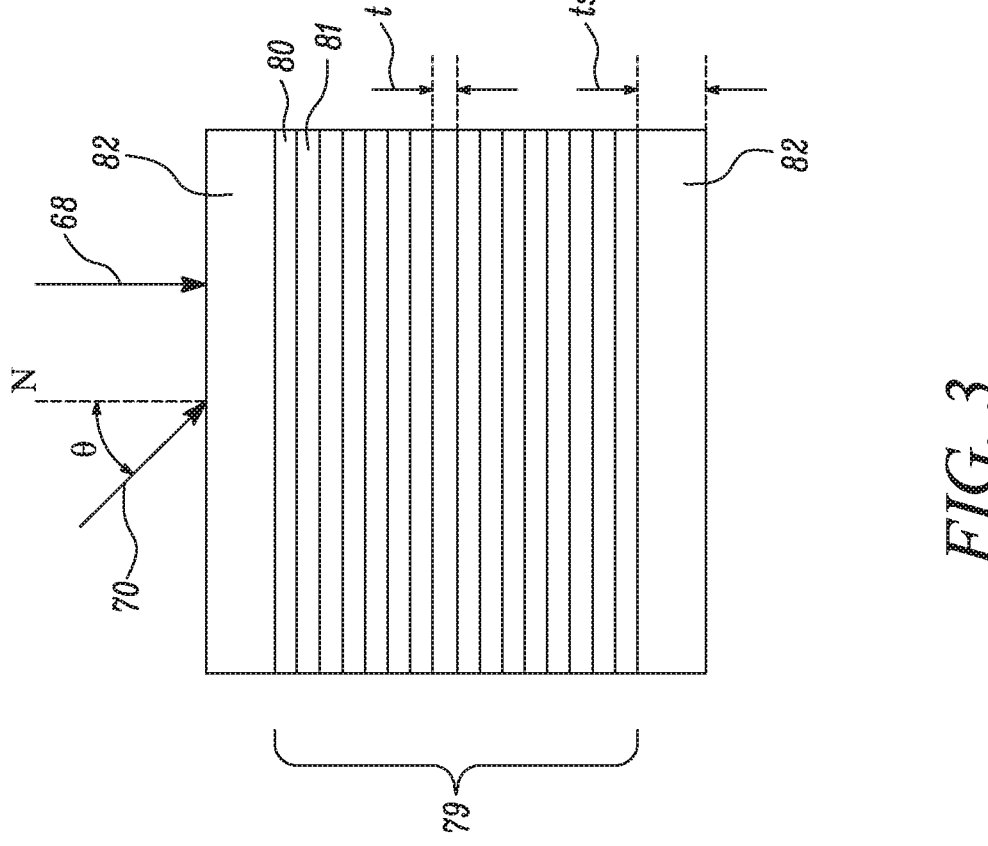
FIG. 3 is a detailed schematic sectional view of any one or both of the first and second optical films of the optical stack of FIG. 2, in accordance with an embodiment of the present disclosure.
Figure 3:
Figure 3:
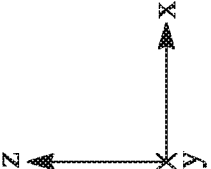

Referring to FIG. 3, a detailed schematic sectional view of any one or both of the first and second optical films 30, 50 is illustrated. In some embodiments, the first optical film 30 includes a plurality of microlayers 79 numbering at least 20 in total. Therefore, in some embodiments, the at least one of the first and second optical films 30, 50 includes the plurality of microlayers 79 numbering at least 20 in total. In some embodiments, at least one of the first and second optical filters 30, 50 includes the plurality of microlayers 79. In some embodiments, the plurality of microlayers 79 number at least 5 in total. In some embodiments, the plurality of microlayers 79 number at least 30, at least 50, at least 100, at least 150, at least 200, at least 250, or at least 300 in total.

In some other embodiments, a multilayer configuration corresponding to the first optical film 30 may be different from a multilayer configuration corresponding to the second optical film 50.

In some embodiments, the plurality of microlayers 79 includes a plurality of alternating first and second microlayers 80, 81. The first and second microlayers 80, 81 are arranged along a thickness (i.e., the z-axis) of the first optical film 30.

In some embodiments, desired properties of the first optical film 30 may be achieved by varying various parameters, such as materials of the first and second microlayers 80, 81, thicknesses of the first and second microlayers 80, 81, the total number of the first and second microlayers 80, 81, etc., or a combination thereof.

In some embodiments, the microlayers 80, 81 in the plurality of microlayers 79 include one or more of an organic material, an inorganic material, a polymeric layer, and a visible light absorbing material. In some embodiments, each of the plurality of microlayers 79 is made of a polymeric material. In such cases, the plurality of microlayers 79 can be interchangeably referred to as a plurality of polymeric microlayers 79. In some embodiments, each of the first and second optical filters 30, 50 includes the plurality of polymeric microlayers 79 numbering at least 5 in total.

In some embodiments, the microlayers 80, 81 may include materials including copolymers of polystyrene (PS) and/or poly (methyl methacrylate) (PMMA). In some embodiments, each of the first microlayers 80 includes a high index optical (HIO) layer of polyethylene terephthalate (PET) homopolymer (100 mol % terephthalic acid with 100 mol % ethylene glycol) having a glass transition temperature (Tg) from about 81 degrees Celsius (° C.) to about 83° C. In some embodiments, each of the first microlayers 80 of the plurality of microlayers 79 includes a HIO layer of polyethylene naphthalate (PEN). In some embodiments, each of the first microlayers 80 includes a HIO layer of low melt PEN.

In some embodiments, each of the second microlayers 81 includes a low index optical (LIO) layer of copolymer of poly (methyl methacrylate) or CoPMMA, available, for example, from Plaskolite, Columbus, OH, under the tradename OPTIX and having a Tg of about 80° C. In some embodiments, each of the second microlayers 81 of the plurality of microlayers 79 includes a LIO layer of CoPET (copolymer of polyethylene terephthalate) or CoPEN (copolymer of poly methyl methacrylate) or a blend of polycarbonate and CoPET.

In some embodiments, the alternating first and second microlayers 80, 81 have respective indices of refraction nx1 and nx2 along a same in-plane first direction. In some embodiments, the first direction is along the x-axis. In other words, nx1, nx2 may correspond to respective indices of refraction of the first and second microlayers 80, 81 along the x-axis. In some embodiments, a magnitude of a difference between nx1 and nx2 is greater than about 0.05. In some embodiments, the magnitude of the difference between nx1 and nx2 is greater than about 0.1, greater than about 0.15, or greater than about 0.2.

In some embodiments, the first and second microlayers 80, 81 have respective indices of refraction ny1 and ny2 along a same in-plane second direction orthogonal to the first direction. In some embodiments, the second direction is along the y-axis. In other words, ny1, ny2 may correspond to respective indices of refraction of the first and second microlayers 80, 81 along the y-axis. In some embodiments, a magnitude of a difference between ny1 and ny2 is greater than about 0.05. In some embodiments, the magnitude of the difference between ny1 and ny2 is greater than about 0.1, greater than about 0.15, or greater than about 0.2.

In some embodiments, the magnitude of the difference between ny1 and ny2 is less than about 0.05. In some embodiments, the magnitude of the difference between ny1 and ny2 is less than about 0.04, less than about 0.03, less than about 0.02, or less than about 0.01.

In some embodiments, a magnitude of at least one of (nx1−ny1) and (nx2−ny2) is less than about 0.05. In some embodiments, the magnitude of the at least one of (nx1−ny1) and (nx2−ny2) may be less than about 0.04, less than about 0.03, less than about 0.02, or less than about 0.01.

In some embodiments, the magnitude of the at least one of (nx1−ny1) and (nx2−ny2) is greater than about 0.2. In some embodiments, the magnitude of the at least one of (nx1−ny1) and (nx2−ny2) may be greater than about 0.3, or greater than about 0.4. Therefore, in some embodiments, the first and second microlayers 80, 81 may exhibit birefringence. In other words, each of the first and second optical films 30, 50 may include a birefringent material. Generally, birefringence refers to a measure of optical anisotropy in a material. Moreover, birefringence is measured as an algebraic difference of two refractive indices of a material along two mutually perpendicular directions.

Each of the plurality of microlayers 79 has an average thickness "t". Specifically, each of the microlayers 79 defines the average thickness "t" along the z-axis. The term "average thickness", as used herein, refers to an average thickness along a plane (i.e., the x-y plane) of a microlayer. In some embodiments, each of the microlayers 79 has the average thickness "t" of less than about 500 nm. In some embodiments, each of the microlayers 79 has the average thickness "t" of less than 450 nm, less than 400 nm, less than 350 nm, less than 300 nm, less than 250 nm, or less than 200 nm. In some embodiments, each of the polymeric microlayers 79 has the average thickness "t" of less than about 500 nm.

The first optical film 30 further includes at least one skin layer 82. In some embodiments, the at least one skin layer 82 has an average thickness "ts" of greater than about 500 nm. In some embodiments, the at least one of the first and second optical films 30, 50 includes the at least one skin layer 82. In some embodiments, the at least one skin layer 82 has the average thickness "ts" of greater than about 750 nm, greater than about 1000 nm, greater than about 1500 nm, or greater than about 2000 nm. The at least one skin layer 82 may act as a protective layer of the first optical film 30. In the illustrated embodiment of FIG. 3, the first optical film 30 includes a pair of opposing outermost skin layers 82. For example, the skin layers 82 of FIG. 3 may act as protective boundary layers (PBL) for the first optical film 30.

FIG. 4A illustrates a schematic view of the sensor material 40 according to an embodiment of the present disclosure. As shown in FIG. 4A, in some embodiments, the test material 40 converts at least a portion of the incident light 120 having the first wavelength $\lambda 1$ to the emitted light 121 having the second wavelength $\lambda 2$.

Figure 4C:
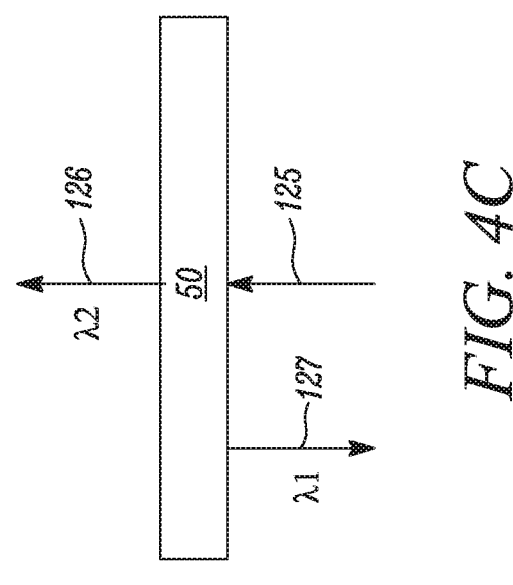
FIG. 4C is a schematic view of the second optical film of the optical stack of FIG. 2, in accordance with an embodiment of the present disclosure.
Figure 4B:
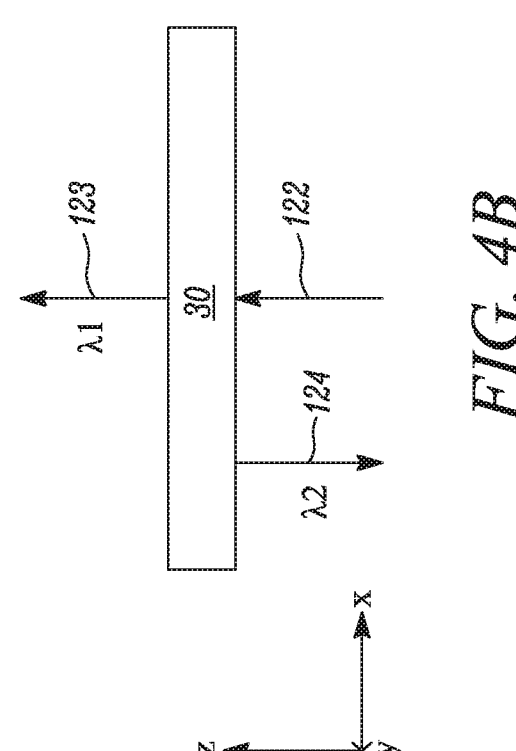
FIG. 4B is a schematic view of the first optical film of the optical stack of FIG. 2, in accordance with an embodiment of the present disclosure.

FIG. 4B illustrates a schematic view of the first optical film 30 according to an embodiment of the present disclosure. As shown in FIG. 4B, in some embodiments, the first optical film 30 is configured to transmit at least a portion of an incident light 122 as a transmitted light 123 having the first wavelength $\lambda 1$. Further, in some embodiments, the first optical film 30 is configured to reflect at least another portion of the incident light 122 as a reflected light 124 having the second wavelength $\lambda 2$.

FIG. 4C illustrates a schematic view of the second optical film 50 according to an embodiment of the present disclosure. As shown in FIG. 4B, in some embodiments, the second optical film 50 is configured to transmit at least a portion of an incident light 125 as a transmitted light 126 having the second wavelength $\lambda 2$. Further, in some embodiments, the second optical film 50 is configured to reflect at least another portion of the incident light 125 as a reflected light 127 having the first wavelength $\lambda 1$.

Figure 5A:
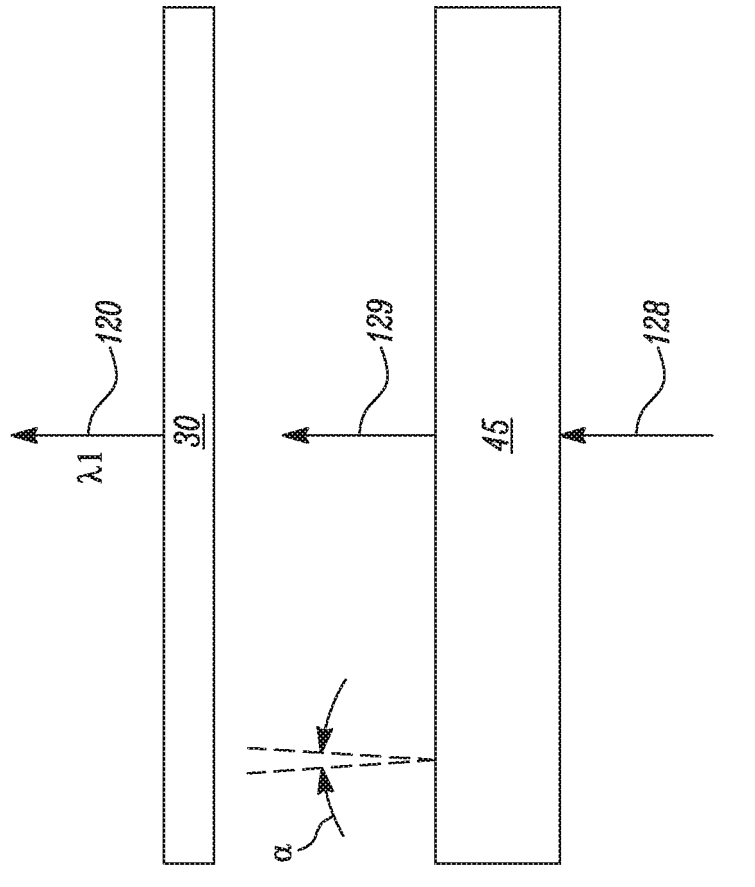
FIG. 5A is a schematic view of the first optical film and a light collimating film (LCF), in accordance with an embodiment of the present disclosure.
Figure 5A:
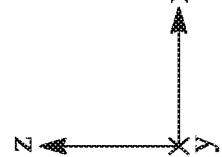

Referring to FIG. 4A, in some embodiments, the incident light 120 is substantially collimated, i.e., light rays of the incident light 120 are substantially parallel to each other. To generate the substantially collimated incident light 120, a light collimating film 45 is disposed proximate the first optical film 30, as illustrated in FIG. 5A. Referring to FIGS. 1, 4A and 5A, in some embodiments, the light collimating film 45 may be disposed between the light source 20 and the first optical film 30. In some embodiments, the light collimating film 45 may be disposed between the first optical film 30 and the sensor material 40. Therefore, the light collimating film 45 may be disposed in a suitable location in the optical stack 200 such that the incident light 120 is substantially collimated. In some embodiments, the light collimating film 45 may include a collimating multilayer optical film, a microstructure-based collimating film (e.g., a prism film), a light control film, and so forth.

In some embodiments, the light collimating film 45 substantially transmits an incident light 128 as a transmitted light 129 within a narrow angular region defined by a full divergence angle $\alpha$. In other words, the light collimating film 45 is substantially transmissive within the full divergence angle $\alpha$. Any light within the full divergence angle $\alpha$ may be substantially transmitted by the light collimating film 45. However, any light outside the full divergence angle $\alpha$ may be substantially blocked (e.g., reflected or absorbed) by the light collimating film 45. Specifically, the light collimating film 45 may substantially transmit a portion of the incident light 128 that is incident within the full divergence angle $\alpha$ and substantially block a portion of the incident light 128 obliquely incident outside the full divergence angle $\alpha$. An angular divergence of the transmitted light 129 relative to a normal to the light collimating film 45 may therefore be within the full divergence angle $\alpha$.

The first optical film 30 may further transmit at least a portion the transmitted light 129 as the incident light 120. Therefore, in some embodiments, the incident light 120 received by the sensor material 40 is substantially collimated and has the full divergence angle $\alpha$. In some embodiments, the full divergence angle $\alpha$ of the incident light 120 is less than about 20 degrees. In some embodiments, the full divergence angle $\alpha$ of the incident light 120 may be less than about 15 degrees, less than about 10 degrees, or less than about 5 degrees.

In some embodiments, the light 128 includes at least the first wavelength $\lambda 1$. In some other embodiments, the light 128 includes each of the first and second wavelengths $\lambda 1$, $\lambda 2$.

Figure 5B:
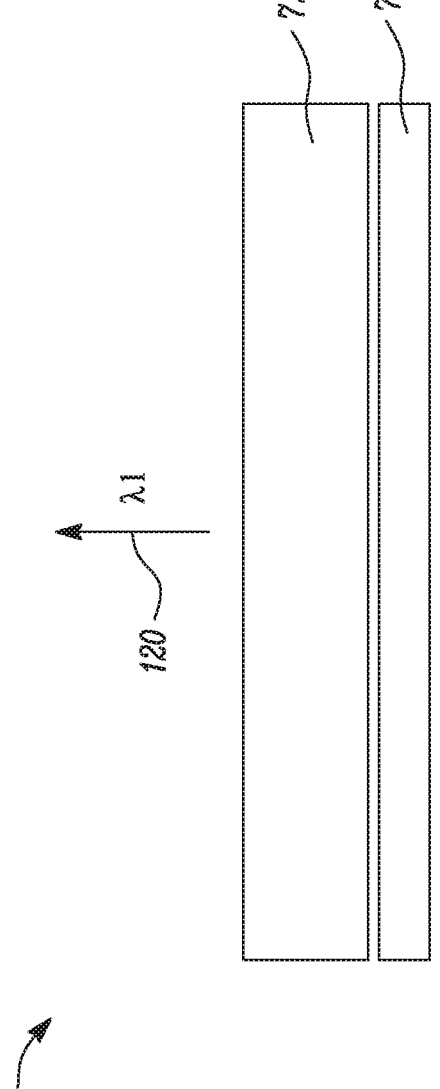
FIG. 5B is a schematic view of a backlight of the optical system of FIG. 1, in accordance with an embodiment of the present disclosure.
Figure 5B:
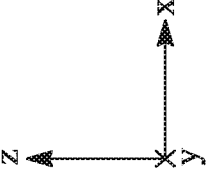

Referring to FIGS. 1 and 5B, in some embodiments, the optical system 300 further includes a backlight 71. FIG. 5B illustrates a schematic view of the backlight 71. In some embodiments, the incident light 120 is provided by the backlight 71 including a lightguide 72 and a back reflector 73. The lightguide 72 is disposed on the back reflector 73. In some embodiments, the backlight 71 may include the light source 20 in a direct-lit configuration. In some embodiments, the backlight 71 may include the light source 20 in an edge-lit configuration.

In some embodiments, the lightguide 72 may be a solid lightguide. In some embodiments, the lightguide 72 may be a step wedge lightguide. In some embodiments, the lightguide 72 may use total internal reflection (TIR) to transport or guide the incident light 120 from the light source 20 toward the optical stack 200. In some cases, the lightguide 72 may improve uniformity of the incident light 120 incident on the sensor material 40. In some embodiments, the lightguide 72 may include a diffusing layer or a light redirecting layer to provide a desired angular distribution of the incident light 120 incident on the sensor material 40. Generally, the back reflector 73 provides recycling of a light within the optical system 300 if any of the light rays are not initially transmitted by the lightguide 72 and the optical stack 200. In some embodiments, the back reflector 73 may be an enhanced specular reflector (ESR).

Figure 6:
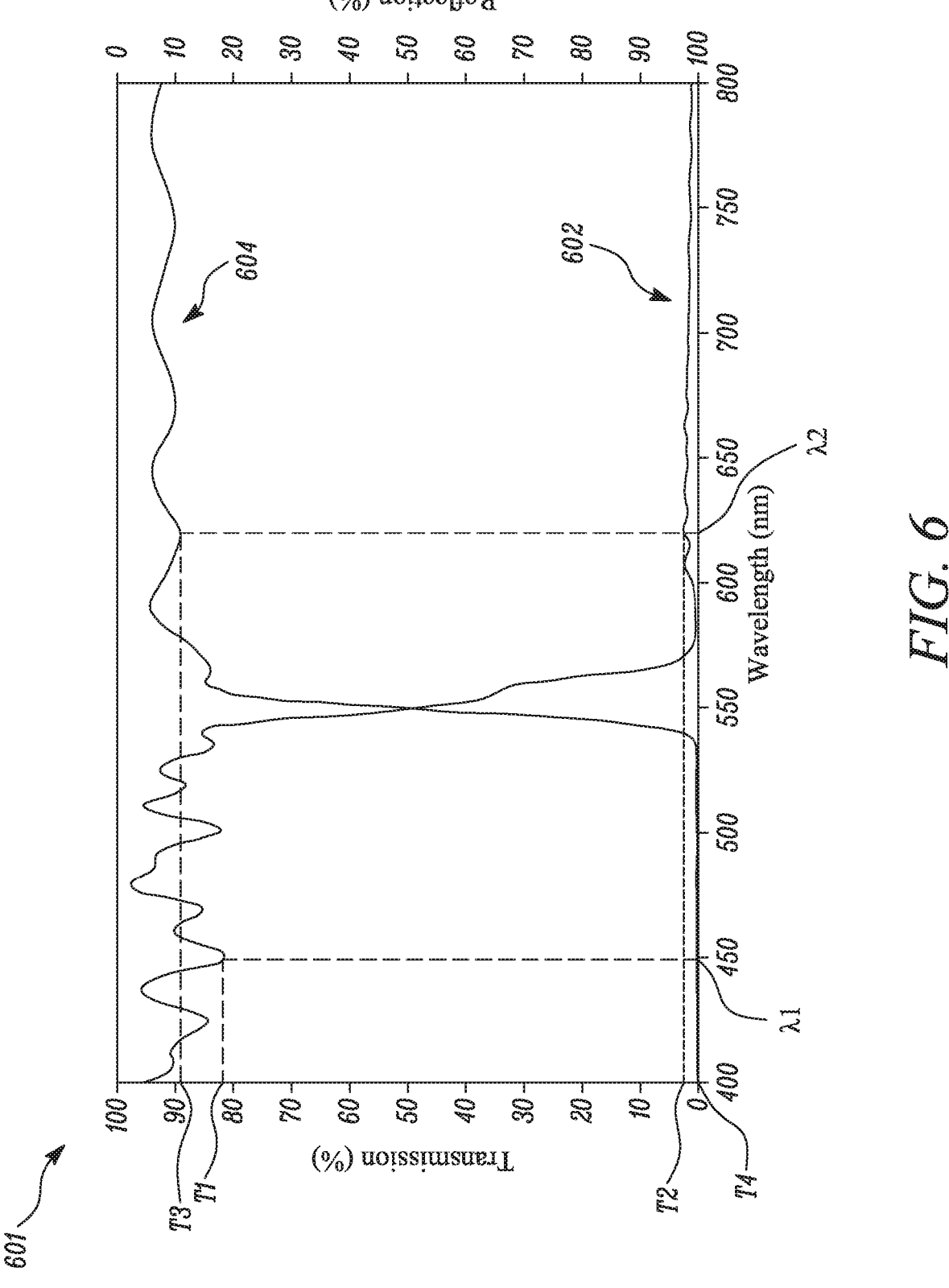
FIG. 6 is a graph depicting transmission versus wavelength for the first and second optical films, in accordance with an embodiment of the present disclosure.

FIG. 6 illustrates an exemplary graph 601 depicting transmission percentage versus wavelength for the first and second optical films 30, 50. Wavelength is expressed in nanometers (nm) in the abscissa. Transmission is expressed as transmission percentage in the left ordinate. Reflection is expressed as reflection percentage in the right ordinate. The reflection percentage is complementary to the transmission percentage, i.e., the reflection percentage=(100−transmission percentage).

Referring to FIGS. 1 and 6, the first optical film 30 includes a third optical property having respective third and fourth values T1, T2 (as shown in FIG. 6) in response to the respective first and second values $\lambda 1$, $\lambda 2$ of the first optical property. In some embodiments, the third optical property of the first optical film 30 includes an optical transmittance of the first optical film 30. In the graph 601, the optical transmittance versus wavelength of the first optical film 30 is depicted by a first optical curve 602. Referring to the first optical curve 602, the optical transmittance has the third value T1 in response to the first value λ1 of the wavelength, and the fourth value T2 in response to the second value λ2 of the wavelength. In other words, the optical transmittance of the first optical film 30 has the third value T1 in response to the first wavelength λ1, and the fourth value T2 in response to the second wavelength λ2. In the illustrated embodiment of FIG. 6, the third value T1 is different from the fourth value T2 by at least a factor of 2. In some embodiments, the third value T1 is different from the fourth value T2 by at least a factor of 5, at least a factor of 10, at least a factor of 50, or at least a factor of 100. In some embodiments, the third value T1 is greater than about 60%. In some embodiments, the third value T1 is greater than about 70%, or greater than about 80%. In some embodiments, the fourth value T2 is less than about 20%. In some embodiments, the fourth value T2 is less than about 15%, less than about 10%, or less than about 5%.

In some embodiments, the third and fourth values T1, T2 of the optical transmittance can be interchangeably referred to as first and second optical transmittances T1, T2, respectively. In some embodiments, the fourth value T2 of the optical transmittance can be interchangeably referred to as a first optical value T2 of the third optical property of the first optical film 30.

In some embodiments, the second optical film 50 includes a third optical property having respective fifth and sixth values T4, T3 in response to the respective first and second values λ1, λ2 of the first optical property. In some embodiments, the third optical property of the second optical film 50 includes an optical transmittance of the second optical film 50. The optical transmittance versus wavelength of the second optical film 50 is depicted by a second optical curve 604. Referring to the second optical curve 604, the second optical film 50 has the fifth value T4 in response to the first value λ1 of the wavelength, and the sixth value T3 in response to the second value λ2 of the wavelength. In other words, the optical transmittance of the second optical film 50 has the fifth value T4 in response to the first wavelength λ1, and the sixth value T3 in response to the second wavelength λ2. In the illustrated embodiment of FIG. 6, the fifth value T4 is different from the sixth value T3 by at least a factor of 2. In some embodiments, the fifth value T4 is different from the sixth value T3 by at least a factor of 5, at least a factor of 10, at least a factor of 50, or at least a factor of 100. In some embodiments, the sixth value T3 is greater than about 60%. In some embodiments, the sixth value T3 is greater than about 70%, or greater than about 80%. In some embodiments, the fifth value T4 is less than about 20%. In some embodiments, the fifth value T4 is less than about 15%, less than about 10%, or less than about 5%.

In some embodiments, the fifth value T4 is different from the third value T1 by at least a factor of 2. In some embodiments, the fifth value T4 may be different from the third value T1 by at least a factor of 5, at least a factor of 10, at least a factor of 50, or at least a factor of 100. In the illustrated embodiment of FIG. 6, the sixth value T3 is different from the fourth value T2 by at least a factor of 2. In some embodiments, the sixth value T3 may be different from the fourth value T2 by at least a factor of 5, at least a factor of 10, at least a factor of 50, or at least a factor of 100.

In some embodiments, the sixth value T3 of the optical transmittance can be interchangeably referred to as a second optical value T3 of the third optical property of the second optical film 50.

In some embodiments, the second optical film 50 includes the third optical property that is same as the third optical property of the first optical film 30. In other words, the first and second optical films 30, 50 include the same third optical property having respective first and second optical values T2, T3 in response to the first optical property of the first optical response 41 of the sensor material 40. Specifically, the first and second optical films 30, 50 include the same third optical property having respective first and second optical values T2, T3 in response to the second value λ2 of the wavelength of the first optical response 41. In other words, the first and second optical films 30, 50 include the same third optical property having respective first and second optical values T2, T3 in response to the second wavelength λ2 of the first optical response 41. Further, in some embodiments, the first and second optical films 30, 50 include the same third optical property having respective first and second optical values T2, T3 in response to the wavelength of the emitted light 121. Specifically, the first and second optical films 30, 50 include the same third optical property having respective first and second optical values T2, T3 in response to the second wavelength λ2 of the emitted light 121.

In some embodiments, the same third optical property of the first and second optical films 30, 50 includes an optical transmittance of the first and second optical films 30, 50. Referring to the first optical curve 602 in the graph 601, the first optical film 30 has the optical transmittance T2 in response to the wavelength λ2 of the emitted light 121. Referring to the second optical curve 604 in the graph 601, the second optical film 50 has the optical transmittance T3 in response to the wavelength λ2 of the emitted light 121.

In the illustrated embodiment of FIG. 6, the first optical value T2 is different from the second optical value T3 by at least a factor of 2. In some embodiments, the first optical value T2 is different from the second optical value T3 by at least a factor of 5, at least a factor of 10, at least a factor of 50, or at least a factor of 100.

In some embodiments, the first optical value T2 is less than about 20%. In some embodiments, the first optical value T2 is less than about 15%, less than about 10%, or less than about 5%. In some embodiments, the second optical value T3 is greater than about 60%. In some embodiments, the second optical value T3 is greater than about 70%, greater than about 80%, or greater than about 85%.

In some embodiments, for a substantially normally incident light 68 (shown in FIG. 3) and for at least one wavelength in the visible wavelength range from about 420 nm to about 680 nm, the at least one of the first and second optical films 30, 50 transmits at least 60% of the incident light 68 having a first polarization state, and reflects at least 60% of the incident light 68 having an orthogonal second polarization state. In some embodiments, for the substantially normally incident light 68 and for the least one wavelength in the visible wavelength range from about 420 nm to about 680 nm, the at least one of the first and second optical films 30, 50 transmits at least 60% of the incident light 68 for each of the mutually orthogonal first and second polarization states. In such cases where the first optical film 30 transmits at least 60% of the incident light 68 for each of the mutually orthogonal first and second polarization states, the first optical film 30 is a partial mirror. In such cases where the second optical film 50 transmits at least 60% of the incident light 68 for each of the mutually orthogonal first and second polarization states, the second optical film 50 is a partial mirror.

In some embodiments, the first polarization state is a P polarization state, and the second polarization state is a S polarization state. In some other embodiments, the first polarization state is a S polarization state, and the second polarization state is a P polarization state. In some embodiments, the first polarization state is generally along the x-axis, while the second polarization state is generally along the y-axis.

Referring to the first optical curve 602 in the graph 601, for an incident light 70 (shown in FIGS. 1 and 3) incident at a target incident angle θ and for at least one polarization state, the first optical filter 30 transmits at least 60% of the incident light 70 having the first wavelength λ1, and reflects at least 60% of the incident light 70 having the second wavelength λ2 different from the first wavelength λ1. The target incident angle θ is measured with respect to a normal N to the plane of any one or both of the first and second optical filters 30, 50 (as shown in FIG. 3). In an example, the normal N may be orthogonal to the x-y plane and extends along the z-axis.

In some embodiments, for the incident light 70 incident at the target incident angle θ and for the at least one polarization state, the first optical filter 30 transmits at least 70%, or at least 80% of the incident light 70 having the first wavelength λ1. In some embodiments, the first optical filter 30 transmits the excitation signal 31 having the first wavelength λ1 in response to the incident light 70 having the first wavelength λ1. In some embodiments, for the incident light 70 incident at the target incident angle θ and for the at least one polarization state, the first optical filter 30 reflects at least 70%, at least 80%, or at least about 90% of the incident light 70 having the second wavelength λ2. In the illustrated embodiment of FIG. 1, the first optical filter 30 reflects the reflected light 32 having the second wavelength λ2 in response to the incident light 70 having the second wavelength λ2.

Referring to FIGS. 1 and 4A, in some embodiments, when the incident light 70 is transmitted by the first optical filter 30, the incident light 70 having the first wavelength λ1 is incident on the test material 40. In some embodiments, for the incident light 70 incident at the target incident angle θ and for at least one polarization state, the test material 40 converts at least a portion of the incident light 70 having the first wavelength λ1 to the emitted light 121 having the second wavelength λ2. Specifically, during photoluminescence, the test material 40 converts at least the portion of the incident light 120 having the first wavelength λ1 to the emitted light 121 having the second wavelength λ2. In some embodiments, for the incident light 70 incident at the target incident angle θ and for each of the mutually orthogonal first and second polarization states, the test material 40 converts at least a portion of the incident light 70 having the first wavelength λ1 to the emitted light 121 having the second wavelength λ2.

Referring to the second optical curve 604 in the graph 601, for the incident light 70 incident at the target incident angle θ and for the at least one polarization state, the second optical filter 50 transmits at least 60% of the incident light 70 having the second wavelength λ2, and reflects at least 60% of the incident light 70 having the first wavelength λ1.

In some embodiments, for the incident light 70 incident at the target incident angle θ and for the at least one polarization state, the second optical filter 50 transmits at least 70%, or at least 80% of the incident light 70 having the second wavelength λ2. In some embodiments, the second optical filter 50 transmits the light 51 having the second wavelength λ2 in response to the incident light 70 having the second wavelength λ2. In some embodiments, for the incident light 70 incident at the target incident angle θ and for the at least one polarization state, the second optical filter 30 reflects at least 70%, at least 80%, or at least about 90% of the incident light 70 having the first wavelength λ1. In the illustrated embodiment of FIG. 1, the second optical filter 50 reflects the light 52 having the first wavelength λ1 in response to the incident light 70 having the first wavelength λ1.

In some embodiments, the target incident angle θ can be interchangeably referred to as an incident angle θ.

Referring to FIGS. 1, 3 and 6, for the same incident angle θ, the first optical film 30 has the first and second optical transmittances T1, T2 at the respective first and second wavelengths λ1, λ2. In some embodiments, the first optical transmittance T1 is at least about 60%, at least about 70%, or at least about 80% at the first wavelength λ1. In some embodiments, the second optical transmittance T2 is less than about 20%, less than about 10%, or less than about 5% at the second wavelength λ2. The first and second optical transmittances T1, T2 are different from each other by at least a factor of 2. In some embodiments, the first and second optical transmittances T1, T2 are different from each other by at least a factor of 5, at least a factor of 10, at least a factor of 50, or at least a factor of 100.

Referring to the first optical curve 602 in the graph 601, the first optical film 30 transmits greater than about 70% of the incident light 70 at the first wavelength λ1, and reflects greater than about 70% of the incident light 70 at the second wavelength λ2. Referring to the second optical curve 604 in the graph 601, the second optical film 50 reflects greater than about 70% of the incident light 70 at the first wavelength) λ1, and transmits greater than about 70% of the incident light 70 at the second wavelength 22. In other words, for the incident light 70, the first optical film 30 is substantially more optically transmissive than the second optical film 50 at the first wavelength λ1 and substantially more reflective than the second optical film 50 at the different second wavelength λ2.

With reference to FIGS. 1 to 6, the optical system 300 including the optical stack 200 may be used to sense the presence of the analyte, for example, oxygen. The optical stack 200 may be irradiated with the light λ1 having at least the first wavelength λ1, and may substantially transmit the light 51 having at least the second wavelength λ2. In some cases, the second wavelength λ2 is a relatively longer wavelength than the first wavelength λ1, and hence exhibits a lower energy due to the phenomenon of fluorescence. Hence, upon irradiation with the incident light 120 having the first wavelength λ1, the sensor material 40 may transmit the differently colored emitted light 121 having the second wavelength λ2.

The sensor material 40 may have to be irradiated with the incident light 120 having the first wavelength λ1 to cause fluorescence. The first optical filter 30 including the plurality of microlayers 79 may have a relatively high optical transmittance at the first wavelength λ1, such that at least the portion of the incident light 120 having the first wavelength λ1 is substantially transmitted by the first optical filter 30 and further absorbed by the sensor material 40. Further, the first optical filter 30 may have a relatively high optical reflectance at the second wavelength λ2, such that at least a portion of the incident light 120 having the second wavelength λ2 is substantially reflected by the first optical filter 30, thereby facilitating the incident light 120 incident on the sensor material 40 to substantially have the first wavelength λ1. The sensor material 40 converts at least the portion of the incident light 120 having the first wavelength λ1 to the emitted light 121 having the second wavelength λ2. Therefore, the first optical filter 30 may maximize transmission of the incident light 120 having the first wavelength λ1, which may be absorbed by the sensor material 40, while minimizing transmission of light having the second wavelength $\lambda 2$.

Further, in some cases, a part of the incident light 120 having the first wavelength $\lambda 1$ may pass through or be transmitted through the sensor material 40 toward the second optical filter 50, without being absorbed by the sensor material 40. The second optical filter 50 including the plurality of microlayers 79 may have a relatively high optical reflectance at the first wavelength $\lambda 1$, such that the part of the incident light 120 having the first wavelength $\lambda 1$ is substantially reflected by the second optical filter 50 toward the sensor material 40, and may be further absorbed by the sensor material 40. Therefore, the second optical filter 50 may allow the part of the incident light 120 having the first wavelength $\lambda 1$ that is transmitted by the sensor material 40 to be reused and reabsorbed by the sensor material 40. Thus, the optical system 300 including the optical stack 200 may provide a desirable arrangement of the first and second optical filters 30, 50, such that a maximum amount of the incident light 120 having the first wavelength $\lambda 1$ may be absorbed by the sensor material 40 to facilitate an improved conversion of the incident light 120 to the emitted light 121. In other words, the optical system 300 may provide an improved arrangement for a maximum utilization of the incident light 120 to cause the fluorescence upon absorption by the sensor material 40.

Further, the second optical filter 50 including the plurality of microlayers 79 may have a relatively high optical transmittance at the second wavelength $\lambda 2$, such that at least a portion of the emitted light 121 having the second wavelength $\lambda 2$ is substantially transmitted by the second optical filter 50, and further detected by the optical detector 60. Therefore, the second optical filter 50 may facilitate detection, imaging and/or analysis of the emitted light 121 having the second wavelength $\lambda 2$.

The sensor material 40 may emit the emitted light 121 in various directions. For example, the sensor material 40 may emit the emitted light 121 towards both the first and second optical filters 30, 50. In some cases, a portion of the emitted light 121 having the second wavelength $\lambda 2$ may be emitted by the sensor material 40 away from the second optical filter 50 and toward the first optical filter 30. The first optical filter 30 may have a relatively high optical reflectance at the second wavelength $\lambda 2$, such that at least the portion of the emitted light 121 having the second wavelength $\lambda 2$ is substantially reflected by the first optical filter 30 toward the second optical filter 50, and further detected by the optical detector 60. Thus, the optical detector 60 may receive a maximum amount of the emitted light 121 having the second wavelength $\lambda 2$. In other words, the optical system 300 including the first and second optical filters 30, 50 may be designed in such a way that the optical detector 60 may receive the maximum amount of the emitted light 121 having the second wavelength $\lambda 2$. The optical detector 60 may form an optical image of the sensor material 40 and sense the optical intensity of the emitted light 121 having the second wavelength $\lambda 2$, for sensing the analyte and thereby enabling fluorescence based optical analysis. Further, the optical detector 60 may form the optical image of the sensor material 40 substantially without any optical distortion or scattering of light by the plurality of microlayers 79 in each of the first and second optical films 30, 50. This is in contrast to any conventional microstructure-based analytical units that tend to cause optical distortion and scattering of light. The optical system 300 may allow visual inspection of the sensor material 40 due to minimal or zero optical distortion. Therefore, the optical system 300 including the first and second optical filters 30, 50 may conduct efficient and improved optical analysis in a desired field of application.

Therefore, the optical stack 200 including the first and second optical filters 30, 50 may provide an efficient recycling of the incident light 120 having the first wavelength $\lambda 1$, such that a maximum possible quanta of the incident light 120 is absorbed by the sensor material 40 and converted to the emitted light 121. Specifically, the optical stack 200 may minimize an amount of a transmitted light 53 having the first wavelength $\lambda 1$ that is transmitted by the first optical filter 30 away from the sensor material 40. Further, the optical stack 200 may provide an efficient collection of the emitted light 121 such that a maximum possible quanta of the emitted light 121 is detected by the optical detector 60. Specifically, the optical stack 200 may minimize an amount of light having the second wavelength $\lambda 2$ that is emitted by the sensor material 40 away from the optical detector 60. Hence, the optical system 300 including the optical stack 200 may have a significantly improved signal to noise ratio as compared to conventional testing or diagnostic units. Further, the optical system 300 including the optical stack 200 may substantially improve a signal to noise ratio of fluorescence based optical analysis.

Further, a change in the optical intensity of the emitted light 121 with an increase in oxygen concentration may allow accurate determination of oxygen level or concentration in the sensor material 40. The optical detector 60 may be used in combination with the optical stack 200 for determining the presence of oxygen, and various other analytes. Further, various other devices, such as controllers, electronic devices (e.g., smartphones), etc., may be combined with the optical stack 200 as per desired application attributes. In some cases, additional layers may be combined with the first and second optical filters 30, 50. Such optical layers may include secondary optical filters, light redirecting layers, protective layers, sensing layers, etc. The optical stack 200 may also be used to sense the presence of other analytes, for example, by varying the properties of the sensor material 40, as per desired applications.

Therefore, the first and second optical filters 30, 50 may provide spectral filtering (based on wavelength) to allow the sensor material 40 to receive the incident light 120 having the first wavelength $\lambda 1$ and the optical detector 60 to receive the emitted light 121 having the second wavelength $\lambda 2$. Additionally, the first optical filter 30 may be used to substantially block light from other sources (e.g., ambient light) from reaching the sensor material 40. The second optical filter 50 may further substantially prevent light other than the emitted light 121 from being transmitted to the optical detector 60. The first optical filter 30 may block an incident light having the second wavelength $\lambda 2$. Similarly, the second optical filter 50 may block an incident light having the first wavelength $\lambda 1$. Therefore, the first and second optical filters 30, 50 may be optimized for a specific combination of the first and second wavelengths $\lambda 1$, $\lambda 2$ to allow accurate sensing of the analyte. A design of the first and second optical filters 30, 50 may be conveniently varied as per various application parameters, for example, the first and second wavelengths $\lambda 1$, $\lambda 2$, a desired thickness of the optical stack 200, a desired permeability of the analyte, etc.

Figure 7:
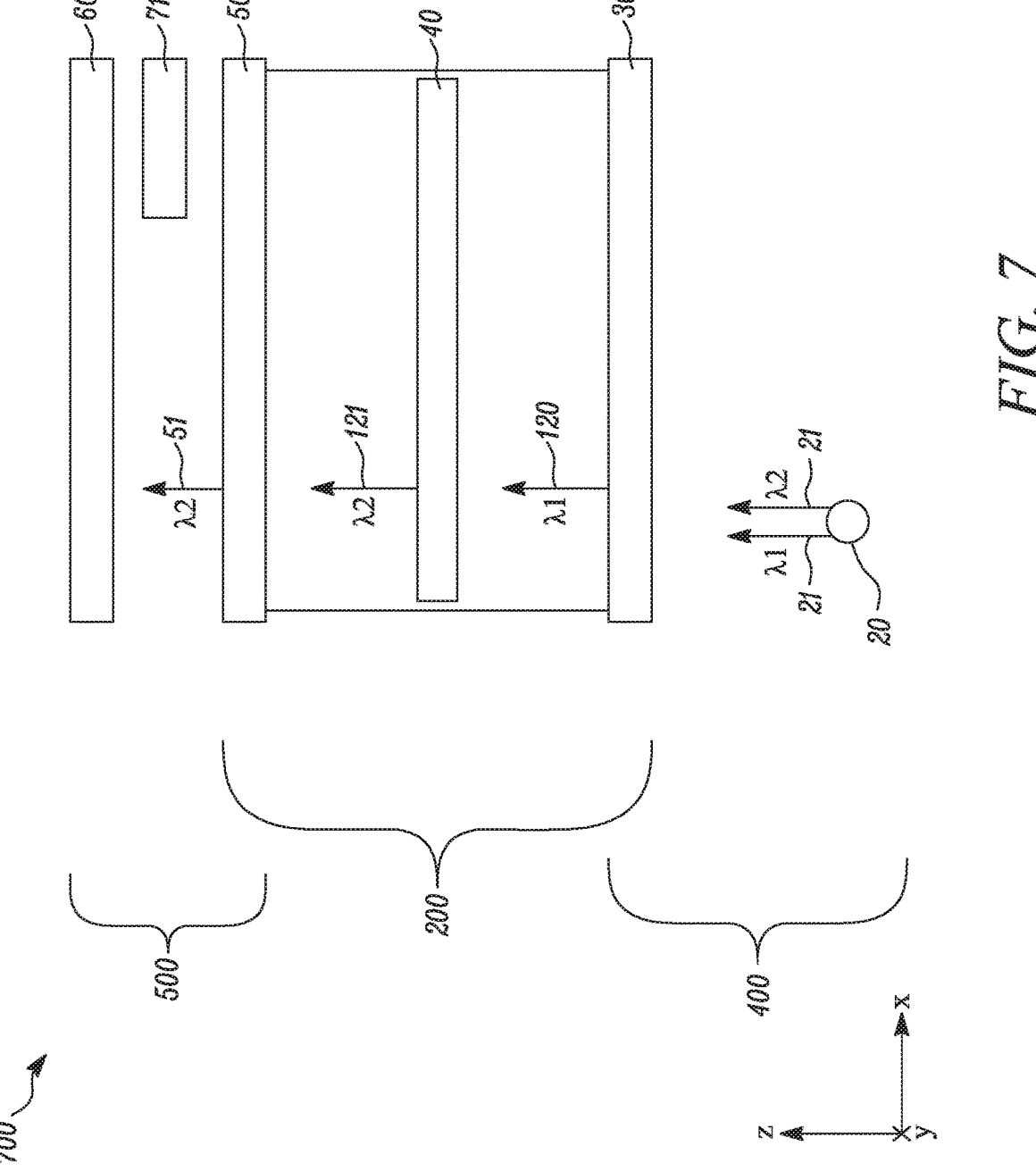
FIG. 7 is a schematic sectional view of an optical system, in accordance with an embodiment of the present disclosure.

FIG. 7 illustrates a schematic sectional view of an optical system 700, according to an embodiment of the present disclosure. The optical system 700 is substantially similar to the optical system 300 illustrated in FIG. 1. Common components between the optical system 300 and the optical system 700 are illustrated by the same reference numerals. However, in the optical system 700, the second optical module 500 further includes a reference film 710 disposed between the optical detector 60 and the second optical film 50.

Referring to FIGS. 1, 4A and 7, in some embodiments, the sensor material 40 of the optical system 700 emits the emitted light 121 having the second wavelength λ2 when irradiated with the incident light 120 having the different first wavelength λ1.

Further, in some embodiments, the optical intensity of the emitted light 121 is sensitive to the presence of the analyte. As shown in FIG. 7, a substantial portion of the emitted light 121 having the second wavelength λ2 is transmitted by the second optical film 50 as the light 51 having the second wavelength λ2, which is further detected by the optical detector 60. Therefore, an optical intensity of the light 51 is based on the optical intensity of the emitted light 121. Thus, it can be stated that the optical intensity of the light 51 is sensitive to the presence of the analyte.

In some cases, the optical system 700 may be utilized in colorimetric testing applications, where the light 51 has the second wavelength λ2 in the visible wavelength range. In such applications, the optical detector 60 of the optical system 700 may be a visible wavelength sensitive detector. In some embodiments, the optical detector 60 may be an optical camera, which may acquire one or more optical images of the sensor material 40. In some other embodiments, the optical detector 60 may be a human eye.

In some examples, the optical intensity of the light 51 may be classified or quantified to ascertain at least one characteristic of the analyte. Further, the reference film 710 may define a correlation of the optical intensity of the light 51, as detected at the optical detector 60, to a classification of the at least one characteristic of the analyte.

In some examples, a classification of the at least one characteristic of the analyte may be a concentration or a quantity of the analyte. In some examples, the classification of the at least one characteristic may be depicted by non-numerical values, such as "negligible level", "low level", "medium level", or "high level" indications, corresponding to the optical intensity of the light 51. In some examples, the at least one characteristic may be depicted by numerical values ranging from a minimum value to a maximum value corresponding to the optical intensity of the light 51.

In some embodiments, the reference film 710 may include a colorimetric patch. In some other embodiments, the reference film 710 may include a colorimetric chart.

Figure 8:
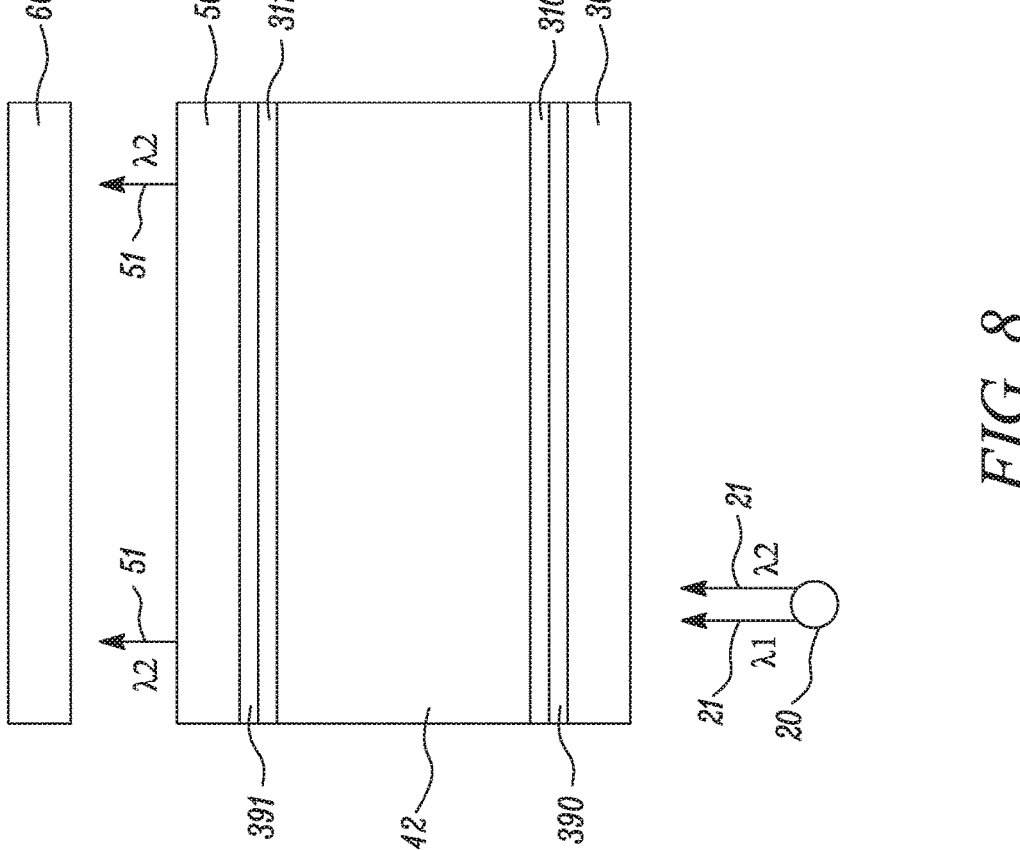
FIG. 8 is a schematic sectional front view of an optical detection system, in accordance with an embodiment of the present disclosure.
Figure 8:
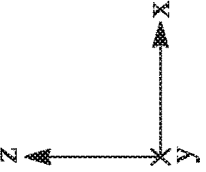
Figure 8:

FIG. 8 illustrates a schematic sectional front view of an optical detection system 300' according to an embodiment of the present disclosure. The optical detection system 300' is substantially similar to the optical system 300 illustrated in FIG. 1. Common components between the optical system 300 and the optical detection system 300' are illustrated by the same reference numerals. However, the optical detection system 300' does not include the sensor material 40, but a test fluid 42. The test fluid 42 is disposed between the first and second optical filters 30, 50. The test fluid 42 is configured to flow along the at least one of the first and second optical filters 30, 50. However, optical properties of the test fluid 42 are similar to the optical properties of the sensor material 40 of the optical system 300. In some embodiments, the test fluid 42 may include any of a liquid material, and a gaseous material.

In the illustrated embodiment of FIG. 8, the test fluid 42 is disposed between two retaining layers 310, 311. The retaining layer 310 is bonded to the first optical filter 30 via an optical adhesive layer 390. Similarly, the retaining layer 311 is bonded to the second optical filter 50 via an optical adhesive layer 391. The optical adhesive layers 390, 391 may be similar to the optical adhesive layers 90, 91, respectively, of FIG. 2. In some embodiments, the retaining layers 310, 311 may be equivalent to the skin layers 82 of FIG. 3.

Referring to FIGS. 1, 4A and 8, in some embodiments, the test fluid 42 is configured to convert at least a portion of the incident light 120 having the first wavelength λ1 to the emitted light 121 having the second wavelength λ2. Specifically, during photoluminescence, the test fluid 42 converts at least the portion of the incident light 120 having the first wavelength λ1 to the emitted light 121 having the second wavelength λ2. In some embodiments, the test fluid 42 is configured to convert at least a portion of the incident light 31 having the first wavelength λ1 to the emitted light 41 having the second wavelength λ2.

EXAMPLES

Figure 9:
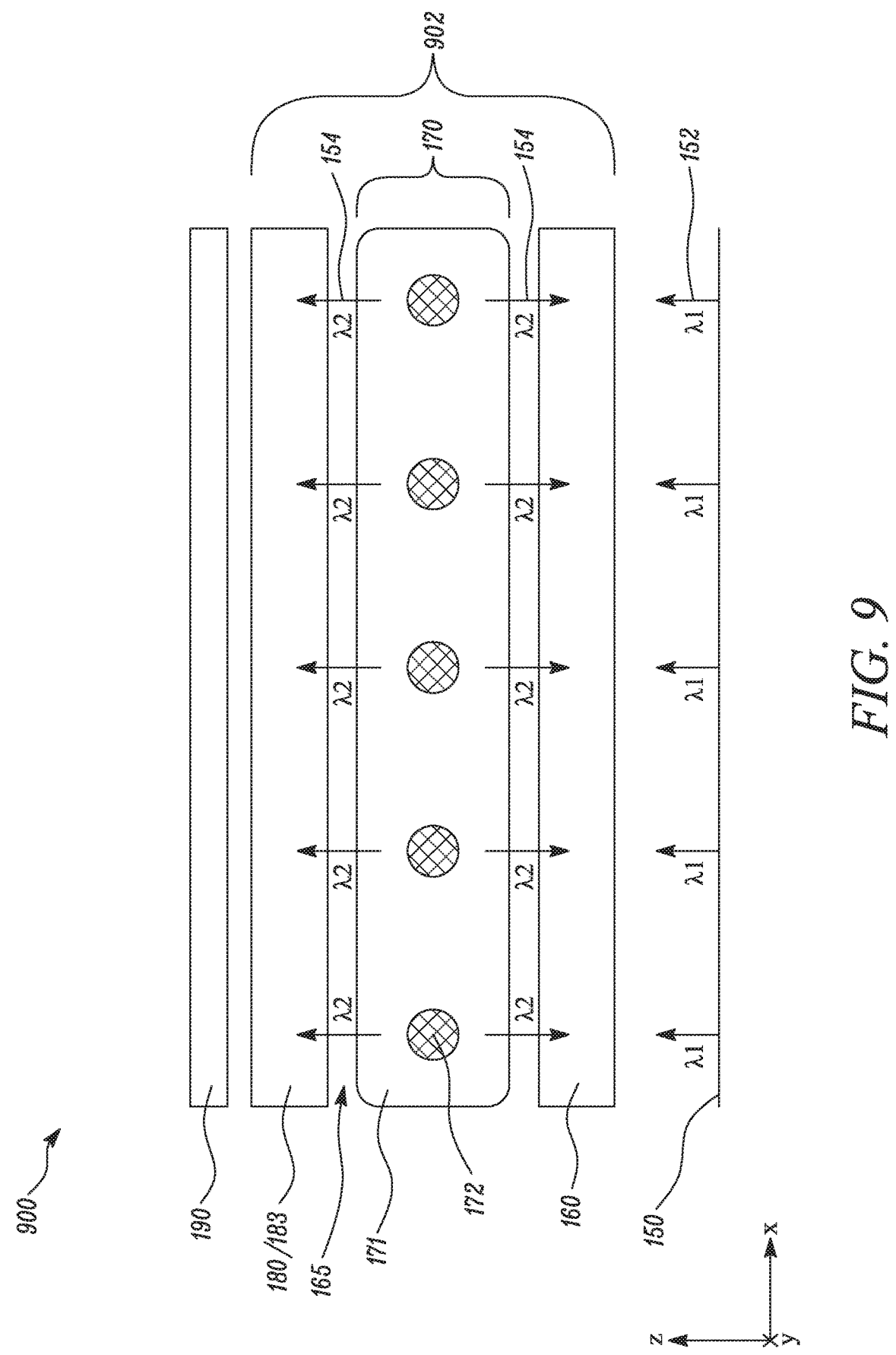
FIG. 9 is a schematic sectional view of an experimental setup for optical imaging of microbial colonies.

Referring to FIG. 9, a schematic sectional view of an experimental setup for optical imaging of microbial colonies using an optical imaging system 900 is illustrated. The optical imaging system 900 included a light source 150 emitting an incident light 152 having the first wavelength λ1 directed substantially toward an optical stack 902. The optical stack 902 included a first optical film 160 and a second optical film 180 disposed opposite the first optical film 160. The first and second optical films 160, 180 defined an optical cavity 165 therebetween. The optical stack 902 further included a test material 170 disposed in the optical cavity 165. The test material 170 included a fluorescent medium in the form of a plating platform. The optical imaging system 900 further included an optical detector 190 configured to detect at least an image of the test material 170. In some examples, the second optical film 180 was replaced with an absorbing optical film 183, i.e., an optical film including absorbing dyes.

Petrifilm™ and Microbial Colonies

The fluorescent plating platform in the test material 170 included a 3M Petrifilm™ 171. The test material 170 further included microbial colonies 172 embedded in the 3M Petrifilm™ 171. The microbial colonies 172 were modelled as a phosphor.

Petrifilm™ 171 is considered as an all-in-one plating system made by 3M. The Petrifilm™ 171 is used extensively in microbiology related industry and fields to culture various microorganisms. The Petrifilm™ 171 is meant to be an efficient means for detection and enumeration, compared to conventional techniques for plating. The Petrifilm™ 171 finds extensive use in testing food.

Typically, microbial colonies that grow on the Petrifilm™ are visualized using colorimetric indicators incorporated into the construction and can be read manually or through an instrument. The colorimetric indicators include one or more of pH dyes, redox dyes, and enzyme-specific chromogenic substrates. For the microbial colonies to become large enough to be visible by eye, the Petrifilm™ plates are required to be incubated for a period of time ranging at least from about 14 hours to about 48 hours. Typically, the incubation period is between about 24 hours and about 48 hours.

The use of fluorescence may accelerate the detectability of colonies by reducing time for incubation. The following section describes an exemplary optical arrangement for fluorescence based microbial colony detection.

For the optical imaging system 900 in the experimental setup, each of the microbial colonies 172 was spherical in shape and was embedded within the Petrifilm™ 171. The microbial colonies 172 were modelled as a phosphor that absorbed the incident light 152 and emitted an emitted light 154. x The test material 170 absorbed the incident light 152 having the first wavelength λ1, and converted at least a part of the absorbed incident light 152 to the emitted light 154 having the second wavelength λ2 different from the first wavelength λ1. The emitted light 154 was emitted in all directions including towards any one or both of the first and second optical films 160, 180.

The optical imaging system 900 was modelled using LightTools from Synopsys. LightTools is an optical design and ray-tracing application. The application is not specifically designed to model biological systems. Therefore, modelling of the microbial colonies comes with some approximations which are outlined below.

Four parameters were used to define a phosphor model: a conversion efficiency, an emission spectrum, an absorption spectrum, and the phosphor particle size.

Aldol 518 beta-D-galactopyranoside was used as a base of the phosphor model. The conversion efficiency defined how well the phosphor could convert the absorbed incident light 152 into the emitted light 154. The conversion efficiency was set to 100%. The emission spectrum covered a wavelength range between about 500 nm and about 700 nm, and an emission peak was at about 620 nm. The absorption spectrum was singly defined at 400 nm with an absorption efficiency of about 50%.

*Escherichia coli* (*E. coli*) was used as a proxy for determining microbial colony properties, specifically a nominal colony membership. Assuming spherical colonies, the colony radius was given as, $$R_{colony} = \left(\frac{3 N_{cell} V_{cell}}{4 \pi F}\right)^{1/3}$$

where $N_{cell}$ was the colony membership;

$V_{cell}$ was the average volume of an *E. coli* cell and was defined at 0.6 μm⁻³; and F was the spherical fill fraction.

The microbial cells were assumed to be arranged in a loose spherical manner with F of 0.63. Each phosphor particle was also modelled as a sphere with a particle radius given as, $$R_{cell} = \left(\frac{3 N_{cell}}{4 \pi F}\right)^{1/3}$$

The phosphor was modeled as a volume scattering element, as described by Mie theory.

Optical Elements

Figure 10A:
FIG. 10A is an exemplary graph depicting transmission versus wavelength for first and second optical films of the experimental setup of FIG. 9.

Referring to FIG. 10A, a graph 1001 of transmission versus wavelength for the first and second optical films 160, 180 of the optical imaging system 900 is illustrated. The graph 1001 depicts optical curves 161, 181 of the first and second optical films 160, 180, respectively. The first optical film 160 substantially transmitted the incident light 152 having the first wavelength λ1. The first optical film 160 substantially reflected the incident light 152 having the second wavelength λ2, and the emitted light 154 having the second wavelength λ2. The second optical film 180 substantially transmitted the emitted light 154 having the second wavelength λ2, and substantially reflected the incident light 152 having the first wavelength λ1. The test material 170 converted at least a part of the incident light 152 having the first wavelength λ1 to the emitted light 154 having the second wavelength λ2.

Figure 10B:
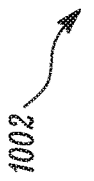
FIG. 10B is another exemplary graph depicting transmission versus wavelength for the first optical film and an absorbing-type optical film of the experimental setup of FIG. 9.

Referring to FIG. 10B, a graph 1002 illustrates transmission versus wavelength for the first optical film 160 and the absorbing-type optical film 183. The graph 1002 depicts an optical curve 161 for the first optical film 160, and an optical curve 182 for the absorbing-type optical film 183. Referring to the optical curve 182 in the graph 1002, the absorbing-type optical film 183 was substantially optically transmissive to the emitted light 154 having the second wavelength λ2, and was substantially absorptive to the incident light 152 having the first wavelength λ1.

Models and Results

The optical imaging system 900 was designed and constructed within LightTools with the ability to turn on and off different optical elements, namely the light source 150, the first optical film 160, the test material 170, the second optical film 180, and the optical detector 190. The colony size was set to 1.2×10⁷ members, which resulted in a colony radius of 140 microns and a phosphor particle size of 600 nm.

A fiducial model consisted of only the second optical film 180 as the absorbing film. This provided a baseline model, which could then be compared to a model having each of the first and second optical films 160, 180. Around 30 million rays were used to trace each model, a number that ensured a converged result for the fiducial model.

Three metrics were chosen to compare each of the models—peak illuminance, relative efficiency of rays that fully propagated through the optical imaging system 900 and were recorded by the optical detector, and efficiency of rays that were converted by the phosphor. Additionally, images were taken to ensure that each of the colonies 172 were detected.

Table 1 shows results for a set of models which varied the number and type of the optical elements used. The effect of replacing the absorbing-type film 183 with the second optical film 180 showed a significant change. Peak illuminance increased by about 26% and total propagated light increased by a factor of about 6.33.

Including the first optical film 160 also increased the efficiency of the optical imaging systems 900. As mentioned, the phosphor was modelled using Mie theory and for the parameters used, was mostly forward scattering. Consequently, any of the emitted light 154 produced by light recycling in the optical stack 902 was most likely traveling away from the optical detector 190. By including the first optical film 160, the emitted light 154 travelling away from the optical detector 190 was collected rather than being lost. With both first and second optical films 160, 180 present, peak illuminance increased by about 35% and total propagated light increased by a factor of about 7.

For comparison, a model was run where the absorbing-type optical film 183 was used in place of the second optical film 180, along with the first optical film 160. A 15% increase in the peak illuminance was seen along with only a 19% increase in the total propagated light. A slight decrease of 11% was seen in the total converted rays. This is due to a 10% reflectivity at 400 nm due to the first optical film 160.

In the Table 1, columns 1-3 show type of the optical elements used in the optical imaging system 900. A particular optical element is used when an "X" is present and absent when "-" is present.

Column 4 gives the peak illuminance in units of Lux.

Column 5 gives a ratio of the peak illuminance of the optical imaging system 900 having the second optical film 180 and the peak illuminance of the optical imaging system 900 having the absorbing-type optical film 183.

Column 6 gives a percentage of rays that are fully propagated through the optical imaging system 900.

Column 7 gives a ratio of the propagated rays of the optical imaging system 900 having the second optical film 180 and the propagated rays of the optical imaging system 900 having the absorbing-type optical film 183.

Column 8 gives a percentage of rays that are converted by the phosphor.

Column 9 gives a ratio of the converted rays of the optical imaging system 900 having the second optical film 180 and the converted rays of the optical imaging system 900 having the absorbing-type optical film 183.

Starting with fiducial setup and varying the colony membership, it was found that the colonies were only marginally detected at a colony size of $2.2 \times 10^6$ members and not detected at all for a membership of $2.5 \times 10^5$ members. When the first and second optical films 160, 180 were used, the colonies were detected at $2.2 \times 10^6$ and $2.5 \times 10^5$ members and not detected at $2.3 \times 10^4$ members.

*E. coli* has a doubling time of about twenty minutes. In the case of marginal detection of the microbial colonies, using the first and second optical films 160, 180, the colonies were detected in about 8.8 doubling times, or about 3 hours earlier, when compared to the optical imaging system 900 with the absorbing-type optical film 183. In the case of clear detection of the microbial colonies, using the first and second optical films 160, 180, the colonies were detected in about 48 doubling times, or about 16 hours earlier, when compared to the optical imaging system 900 with the absorbing-type optical film 183.

TABLE 1

| Results of the experiment setup for the optical imaging system with fixed colony membership | | | | | | | | |
|---|---|---|---|---|---|---|---|---|
| Absorbing Film | Second Optical Film | First Optical Film | Peak Illuminance | Ratio | Percent Propagated | Ratio | Percent Converted | Ratio |
| X | — | — | 32.3 | 1.00 | $2.29 \times 10^{-2}$ | 1.00 | $1.21 \times 10^{-2}$ | 1.00 |
| — | X | — | 40.7 | 1.26 | $1.45 \times 10^{-1}$ | 6.33 | $1.51 \times 10^{-2}$ | 1.25 |
| — | X | X | 43.6 | 1.35 | $1.59 \times 10^{-1}$ | 6.94 | $1.43 \times 10^{-2}$ | 1.18 |
| X | — | X | 37.3 | 1.15 | $2.73 \times 10^{-2}$ | 1.19 | $1.08 \times 10^{-2}$ | 0.89 |

An estimate for how much sooner a colony can be detected with the present optical imaging system 900 could be estimated by varying the colony membership. Results are given in Table 2.

In the Table 2, columns 1-3 show type of the optical elements used in the optical imaging system 900. A particular optical element is used when an "X" is present and absent when "-" is present.

Column 4 gives colony membership.

Column 5 gives the peak illuminance in units of Lux.

Column 6 gives a ratio of the peak illuminance of the optical imaging system 900 having the second optical film 180 and the peak illuminance of the optical imaging system 900 having the absorbing-type optical film 183.

Column 7 gives a percentage of rays that are fully propagated through the optical imaging system 900.

Column 8 gives a ratio of the propagated rays of the optical imaging system 900 having the second optical film 180 and the propagated rays of the optical imaging system 900 having the absorbing-type optical film 183.

These results highlight the capability of the optical imaging system of the present disclosure to quickly and efficiently detect and image analytes.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific

TABLE 2

| Results of the experiment setup for the optical imaging system with varying colony membership | | | | | | | |
|---|---|---|---|---|---|---|---|
| Absorbing Film | Second Optical Film | First Optical Film | Colony Membership | Peak Illuminance | Ratio | Percent Propagated | Ratio |
| X | — | — | $1.2 \times 10^7$ | 32.3 | 1.00 | $2.29 \times 10^{-2}$ | 1.00 |
| X | — | — | $2.2 \times 10^6$ | 16.4 | 0.51 | $1.99 \times 10^{-2}$ | 0.87 |
| X | — | — | $2.5 \times 10^5$ | 4.58 | 0.14 | $1.87 \times 10^{-2}$ | 0.82 |
| — | X | X | $2.5 \times 10^5$ | 6.57 | 0.20 | $1.41 \times 10^{-2}$ | 0.62 |
| — | X | X | $2.3 \times 10^4$ | 1.71 | 0.00 | 0.00 | 0.00 | embodiments discussed herein. Therefore, it is intended that this disclosure be limited only by the claims and the equivalents thereof.

The invention claimed is:

1. An optical stack for sensing a presence of an analyte, the optical stack comprising:

a sensor material comprising a first optical response comprising a first optical property having a second value in response to an excitation signal comprising the first optical property having a first value different from the second value, the first optical response comprising a second optical property sensitive to the presence of the analyte;

a first optical film disposed proximate the sensor material and comprising a third optical property having respective third and fourth values in response to the respective first and second values of the first optical property, the third value different from the fourth value by at least a factor of 2; and a second optical film disposed proximate the sensor material opposite the first optical film, the second optical film comprising the third optical property having respective fifth and sixth values in response to the respective first and second values of the first optical property, the fifth value different from the third value by at least a factor of 2, the sixth value different from the fourth value by at least a factor of 2, wherein:

the excitation signal comprises an incident light at a target incident angle and having at least one polarization state;

the first optical response of the sensor material comprises an emitted light in response to the incident light;

the first optical property comprises a wavelength, the wavelength having the first value for the incident light and the second value for the emitted light;

the second optical property of the emitted light comprises an optical intensity of the emitted light sensitive to the analyte;

the third optical property of the first and second optical films comprises an optical transmittance of the respective first and second optical films for the target incident angle and for the at least one polarization state, the optical transmittance of the first optical film having the third value in response to the first value of the wavelength and the fourth value in response to the second value of the wavelength, the third value being greater than about 60%, the first optical film having an optical reflectance of greater than about 60% for the second value of the wavelength and for the target incident angle and the at least one polarization state, the optical transmittance of the second optical film having the fifth value in response to the first value of the wavelength and the sixth value in response to the second value of the wavelength, the sixth value being greater than about 60%, the second optical film having an optical reflectance of greater than about 60% for the first value of the wavelength and for the target incident angle and the at least one polarization state.

2. The optical stack of claim 1, wherein the first and second values are between about 420 nanometers (nm) and about 680 nm.

3. The optical stack of claim 1, wherein the sensor material comprises a photoluminescent material.

4. The optical stack of claim 1, wherein the analyte comprises oxygen.

5. The optical stack of claim 4, wherein the sensor material is oxygen sensitive so that in a presence of oxygen, the optical intensity of the emitted light decreases.

6. The optical stack of claim 5, wherein the optical intensity of the emitted light decreases with increasing partial pressure of oxygen.

7. The optical stack of claim 1, wherein at least one of the first and second optical films comprises a plurality of polymeric microlayers numbering at least 5 in total, each of the polymeric microlayers having an average thickness of less than about 500 nm.

* * * * *